(12) United States Patent
Bashaw

(10) Patent No.: US 9,069,839 B1
(45) Date of Patent: Jun. 30, 2015

(54) METHOD AND SYSTEM FOR STORING, RETRIEVING, AND SHARING DATA USING A FIELD-ACCESSED DATABASE SYSTEM COMPRISING A MOBILE UNIT

(71) Applicant: Matthew Charles Bashaw, Palo Alto, CA (US)

(72) Inventor: Matthew Charles Bashaw, Palo Alto, CA (US)

( * ) Notice: Subject to any disclaimer, the term of this patent is extended or adjusted under 35 U.S.C. 154(b) by 0 days.

(21) Appl. No.: 14/181,672

(22) Filed: Feb. 16, 2014

Related U.S. Application Data

(63) Continuation of application No. 13/450,473, filed on Apr. 19, 2012, now Pat. No. 8,706,763, which is a continuation of application No. 12/792,742, filed on Jun. 3, 2010, now Pat. No. 8,190,645.

(60) Provisional application No. 61/183,974, filed on Jun. 4, 2009.

(51) Int. Cl.
  *G06F 17/30* (2006.01)
(52) U.S. Cl.
  CPC .................. *G06F 17/30607* (2013.01)
(58) Field of Classification Search
  CPC ....................................................... G06F 17/30
  USPC .................................................. 707/600–899
  See application file for complete search history.

(56) References Cited

U.S. PATENT DOCUMENTS 7,899,756 B2 * 3/2011 Rizzolo et al. ................ 705/300

\* cited by examiner

*Primary Examiner* — Isaac M Woo

(57) ABSTRACT

A method using a field-accessed database system identifies an object by a data identifier, and stores and/or retrieves object data using the associated data identifier. In one mode of operation, a field terminal uploads to a database object-based data and employs the associated data identifier to group the uploaded object data with object data relating to other objects having substantially similar data identifiers. In another mode of operation, the system identifies one or more data products stored in a database and previously grouped according to an identified object's data identifier, and a field terminal downloads from database one or more data products related to the identified object and processes downloaded data products for user access. In another mode of operation, called discover mode, field terminal selects data products in a database using a selection algorithm based on terminal location and downloads these data products from this database, prior to receiving user input used to select final data products of interest to access using field terminal.

20 Claims, 18 Drawing Sheets

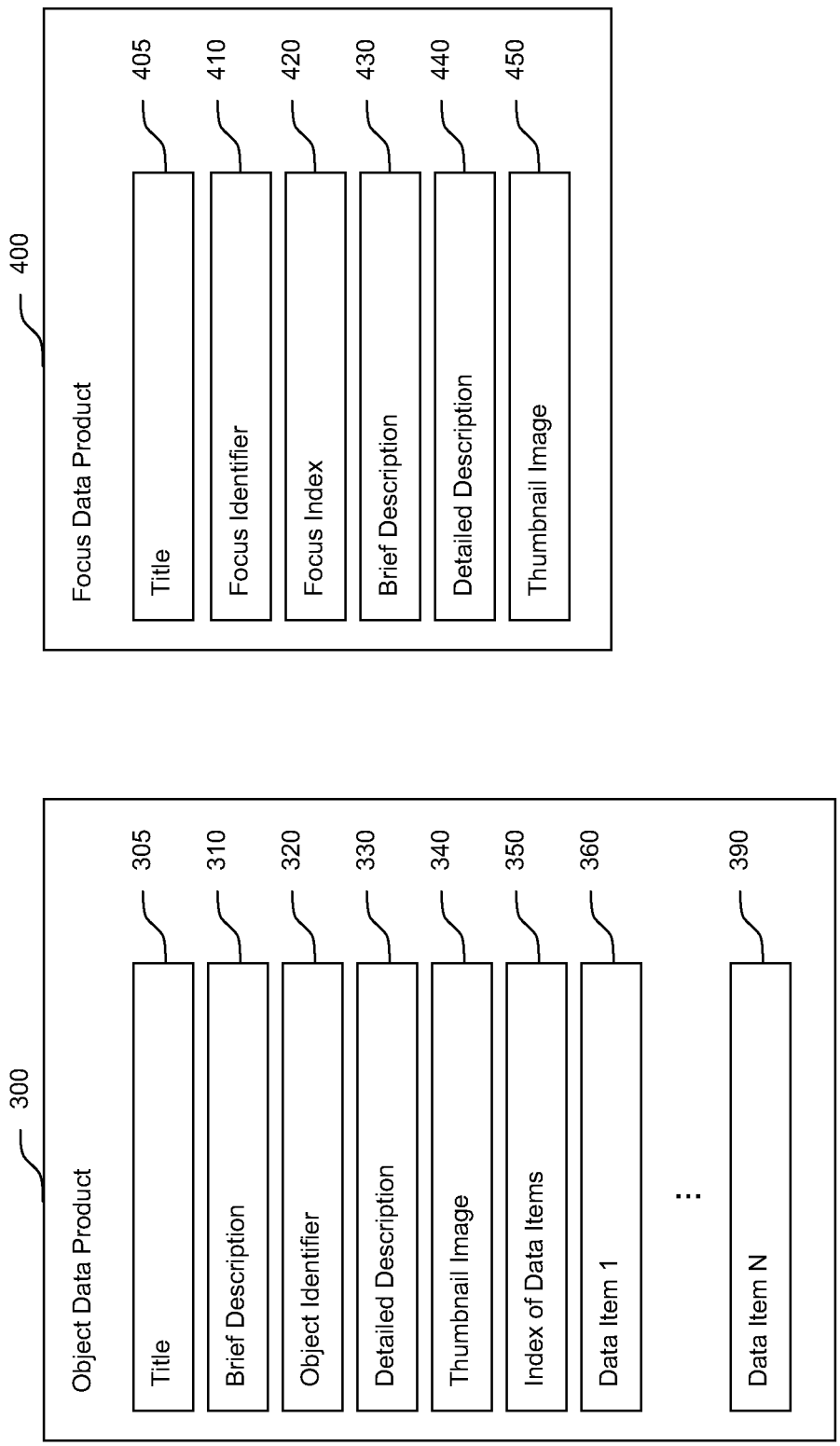

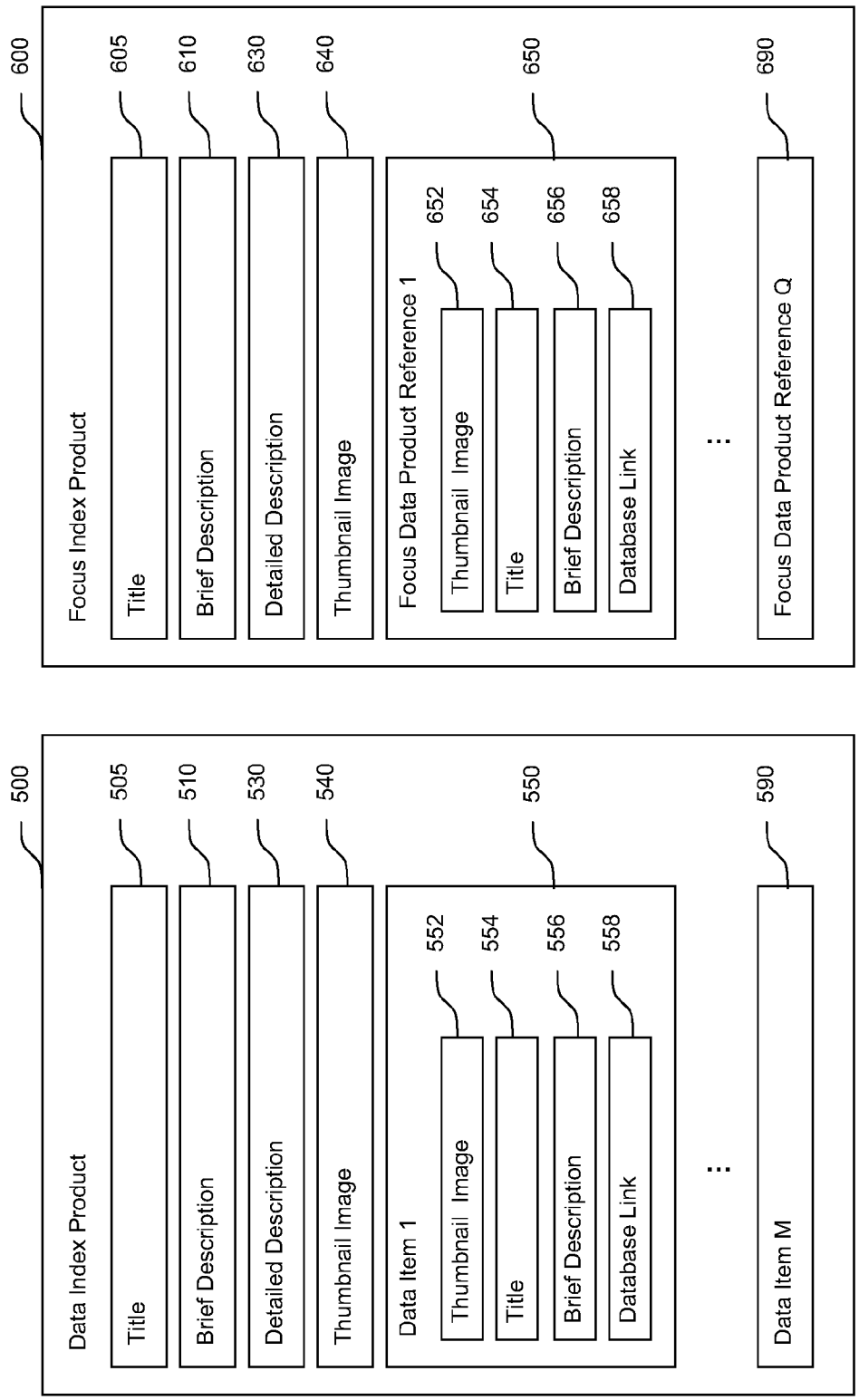

METHOD AND SYSTEM FOR STORING, RETRIEVING, AND SHARING DATA USING A FIELD-ACCESSED DATABASE SYSTEM COMPRISING A MOBILE UNIT

CROSS-REFERENCE TO RELATED APPLICATIONS

This application is a continuation of U.S. patent application Ser. No. 13/450,473, entitled "METHOD AND SYSTEM FOR STORING, RETRIEVING, AND SHARING DATA USING A FIELD-ACCESSED DATABASE SYSTEM COMPRISING A MOBILE UNIT," filed Apr. 19, 2012, by the present inventor, which is incorporated herein by reference, and which is a continuation of U.S. patent application Ser. No. 12/792,742, entitled "METHOD AND SYSTEM FOR STORING, RETRIEVING, AND SHARING DATA USING A FIELD-ACCESSED DATABASE SYSTEM COMPRISING A MOBILE UNIT," filed Jun. 3, 2010, by the present inventor (now U.S. Pat. No. 8,190,645), which is incorporated herein by reference, and which claims the benefit of U.S. provisional patent application Ser. No. 61/183,974, entitled "METHOD AND SYSTEM FOR STORING, RETRIEVING, AND SHARING DATA USING A FIELD-ACCESSED DATABASE SYSTEM COMPRISING A MOBILE UNIT," filed Jun. 4, 2009, by the present inventor, which is incorporated herein by reference.

FIELD OF THE INVENTION

The present invention relates to techniques for storing, retrieving, and sharing data using a field-accessed database system. More particularly, the present invention relates to techniques for storing and retrieving data relating to a point of interest in the field and coupling this data with an identifier that includes state information, such as a physical location. The present invention employs a mobile unit such as a personal digital assistant equipped with a GPS system, coupled to a wireless digital network, such as a 3G network, to access a system server and database.

BACKGROUND OF THE INVENTION

Due to the evolution of well-known social networks such as MySpace and Facebook, it has become commonplace for a user to upload digital data products comprising photo, video, and/or audio data to a social network database to share with other users. In a social network, data products are generally organized according to user, and they are accessed through a web page that presents links to data products identified using, for example, thumbnails and brief descriptions.

According to the Facebook web site (http://www.facebook.com/press/info.php?statistics, retrieved May 8, 2010), Facebook has more than 400 million active users, 50% of its active users log on to Facebook in any given day, the average user has 130 friends, and people spend over 500 billion minutes per month on Facebook. According to the MySpace web site (http://www.myspace.com/pressroom?url=/fact+sheet/, retrieved May 8, 2010), MySpace has more than 113 million monthly active users worldwide and more than 70 million total unique users in the United States. Social network Flickr, having over 35,000,000 users, allows users to upload photos and share them with other users. The Internet-based service "Yelp!" allows users to identify a venue of interests such as a restaurant based on proximity to a user's location, and download data such as photos and brief reviews relating to a venue of interest. "Yelp!" also allows users to upload data related to a selected venue of interest, such as photos and brief reviews, to the "Yelp!" database. According to the "Yelp!" web site, as of March 2010, "Yelp!" reports 31,000,000 visitors accessed "Yelp!" in the prior 30 days, and "Yelp!" users have written over 10,000,000 reviews (http://www.yelp.com/about, retrieved May 29, 2010).

In another field of endeavor, the evolution of GPS locator system applications has led to compact GPS locator systems that provide maps and voice queues to aid in navigation based on location and orientation. Examples include units from Magellan and Garmin, which can be purchased at consumer electronics stores.

In another field of endeavor, the evolution of compact mobile computing devices connected to a wireless digital network, such as the iPhone, produced by Apple, Inc., has led to the development and distribution of a variety of applications that make use of the GPS locator system and other locator systems to identify the location the mobile computing device and download data related to the identified location. Examples of downloaded data include digital maps and listings of nearby restaurants. The "Yelp!" iPhone application establishes user location using built-in iPhone GPS capability and identifies venues of interest according to proximity.

In another field of endeavor, the Google Earth application establishes user location and downloads image information according to a user's location. This image information includes digital maps, satellite imagery, and ground-based imagery. Using Google Earth and the Google application Picasa, an image may be geotagged to link it to a particular location.

What is lacking in the art is a field-accessed database method and system that allows a member of a user community to identify an object by a data identifier, and to store data corresponding to an identified object by employing its data identifier to group it with other data related to the same object, for retrieval by other members of the user community seeking data on the same object. What is further lacking is a system and method that accomplishes storage and/or retrieval of data in this manner using data identifiers that specify the location of an object.

BRIEF DESCRIPTION OF THE INVENTION

Briefly, and in general terms, the present invention manages the exchange of media used to convey content to a recipient. Examples of digital media include, without limitation, digital photos, web pages, e-books, digital audio, and digital video. Examples of analog media include analog audio and analog video.

Aspects of the present invention provide a system that employs a portable network-attached device to identify a point of interest in its vicinity and create new media related to the point of interest, uploads the new media from the network-attached device to a database, stores the new media in the database, and links the new media to an index in the database, wherein the index has existing links to other media in the database and the index is labeled to correspond to the point of interest. Preferably, the network-attached device can collect data related to the point of interest and create new media based on this collected data. The network-attached device preferably connects to the system over a wireless network.

Aspects of the present invention also provide a system that employs a portable network-attached device to identify a point of interest in its vicinity, identifies a database index labeled to correspond to the point of interest and having existing links to media in the database, downloads the linked media to the network-attached device and stores the media in the network-attached device. Alternatively, the system streams the media to the networked-attached device. Preferably, the network-attached device can display or otherwise present media to a user.

Aspects of the present invention further allow multiple portable network-attached devices to access the same index. Users share media related to a common point of interest by storing and retrieving data linked to a common index in the database.

In a preferred embodiment of the present invention, the system utilizes a publicly accessible network infrastructure, and the portable network-attached devices include smartphones available to the public. The exchange of data are managed by servers running publicly accessible social network applications and connected to the publicly accessible network infrastructure.

A preferred embodiment of the present invention employs object data products, which package digital media related to a point of interest as a group of digital media that can be transferred between subsystems, e.g. between a networked-attached device and a database. This preferred embodiment of present invention also employs focus data products, which comprise an index of links to object data products related to a common point of interest and a label that associates the focus data product with the common point of interest. Focus data products are used to store, retrieve, share, and organize object data products that correspond to a point of interest identified by a portable network-attached device.

Other features and advantages of the invention and its preferred embodiments will become apparent from the following detailed description, taken in conjunction with the accompanying drawings, which illustrates by way of example the invention.

BRIEF DESCRIPTION OF THE FIGURES

FIG. 3 is a diagram illustrating member classes comprising an object data product.

FIG. 4 is a diagram illustrating member classes comprising a focus data product.

FIG. 5 is a diagram illustrating member classes comprising a data index product.

FIG. 6 is a diagram illustrating member classes comprising a focus index product.

DETAILED DESCRIPTION

Figure 1A:
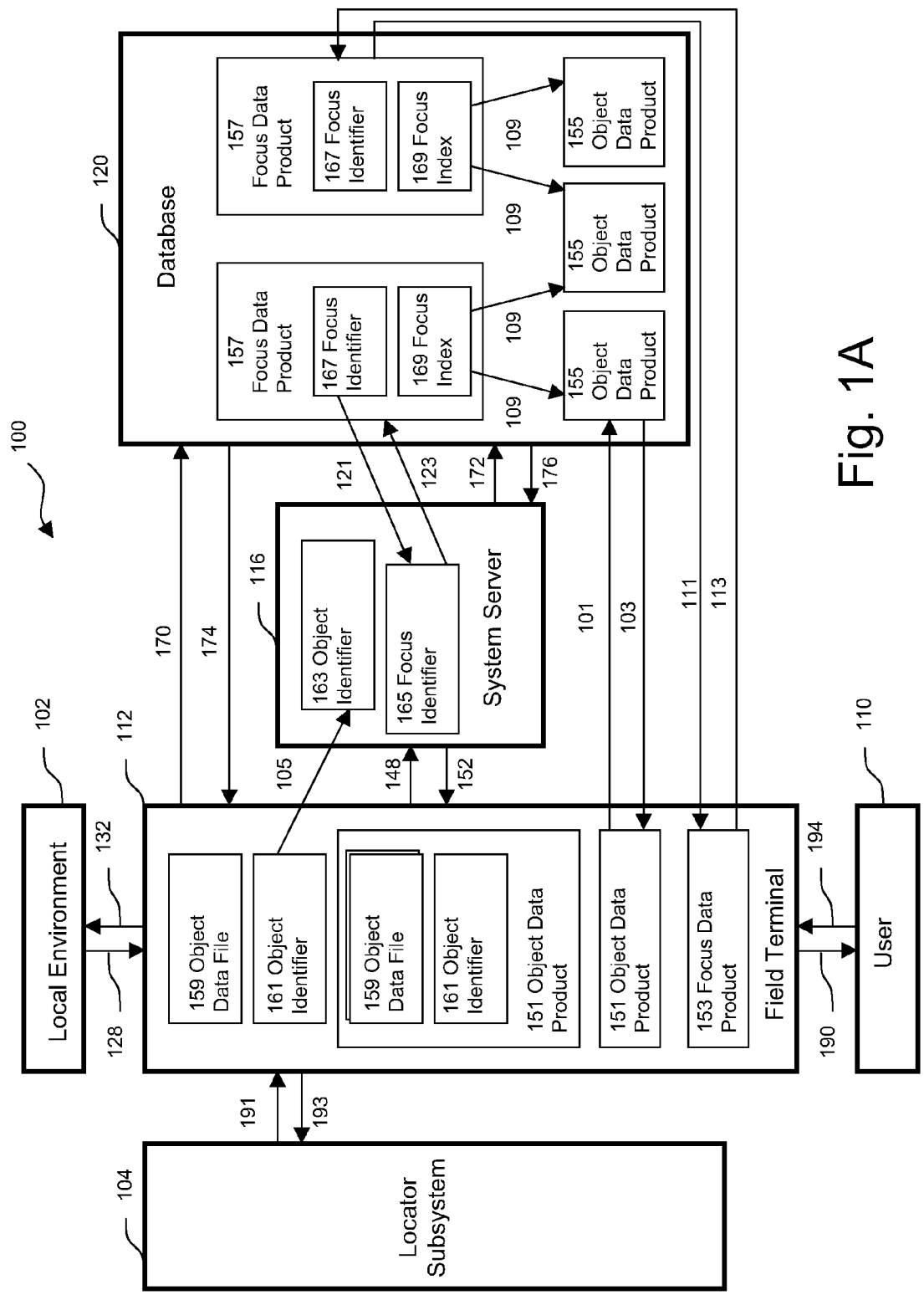
FIG. 1A is an architecture diagram that shows interrelationships of subsystems of a field-accessed database system and data items used by subsystem, according to the present invention.

FIG. 1A illustrates by way of example the functional system architecture of a preferred embodiment of the present invention, using an architecture diagram that shows interrelationships of subsystems of a field-accessed database system and data items used by subsystem.

The functional architecture illustrates data exchange among constituent subsystems in field-accessed database system 100 and serves as a framework to describe system operation. In a preferred embodiment of the present invention, terminal object corresponds to an item identified in the local environment 102 that is selected using field terminal 112. A terminal object maps to object identifier 161, object data file 159, and object data product 151. Object data product 151 is stored in field terminal 112. An object identifier 161 comprises sufficient information to uniquely discriminate a selected terminal object from all other candidate objects. In a preferred embodiment, an object data product 151 comprises digital information that pertains to terminal object; digital information may be organized as one or more object data files 159. Digital information may comprise images, video, and/or audio. Preferably, object data product 151 comprises objected identifier 161 and object data files 159.

Focus data product 157 is stored in database 120. In a preferred embodiment, a focus data product 157 corresponds to an item, or point of interest, in physical space. Preferably, data retrieval and retrieval utilizes object identifier, 161, to select one or more points of interest referenced by respective focus data products, 157 and data storage further utilizes object data product 151 to store new object data products 155 in database 120. Each focus data product 157 comprises corresponding focus identifier 167 and corresponding focus index 169; focus data product 157 is a parent to its respective focus identifier 167 and to its respective focus index 169. In a preferred embodiment, focus identifier 167 comprises sufficient information to uniquely discriminate its respective focus data product 157 from all other focus data products 157. In a preferred embodiment, a focus data product 157 comprises respective focus index 169 having database links 109 to object data products 155 recorded in database 120.

In a preferred embodiment, field-accessed database system 100 comprises locator subsystem 104, local environment 102, user 110, field terminal 112, system server 116, and database 120. In a preferred embodiment, field terminal 112 provides a user 110 access to system 100, comprises onboard instrumentation to characterize its own physical properties, and comprises data collection subsystems to collect data from the local environment 102. Physical properties of field terminal may comprise position and/or orientation.

Field terminal 112 receives user input over interface 194; user input may be generated using common input tools such as a keyboard, touch screen, voice activation, speech recognition, and others. Field terminal 112 also provides user 110 data output 190. Data output 190 may comprise audio, image, video and other formats. Interface 190 may also comprise a removable storage medium to receive terminal output and transfer it to another system.

Field terminal 112 interfaces to locator subsystem 104 to identify its state. State of field terminal 112 may comprise location, orientation, and other properties. A state is represented quantitatively as a state vector. In a preferred embodiment, a state vector represents a location on the surface of the earth as latitude and longitude coordinates. In other embodiments, a state vector may further comprise altitude, orientation on the surface, and/or inclination with respect to the surface. In still other embodiments, a state vector comprises local environmental properties such as temperature, pressure, and humidity. In a preferred embodiment, locator subsystem 104 comprises an external subsystem that functions autonomously and interfaces to field terminal 112 using standard protocols; an example of such as system is the well-known Global Positioning System, or GPS. In this embodiment, field terminal receives data signals 191 from GPS. In another embodiment, locator subsystem 104 comprises a dedicated subsystem designed to interface to field terminal 112 to fulfill specific requirements of field-accessed database system 100. A skilled artisan would know how to configure a dedicated subsystem.

In one embodiment, field terminal 112 transmits signal 193 to locator subsystem 104. A transmitted signal 103 comprises a request for data. Locator subsystem 104 received transmitted signal 193 and replies to requests by sending positioning data via positioning signal interface 191.

In a preferred embodiment, field terminal 112 utilizes data signals 191 received from locator subsystem 104 to produce terminal state vector. Terminal state vector may be stored in random access memory (RAM) or nonvolatile data storage media in field terminal. In one embodiment, field terminal 112 utilizes data signals 191 in conjunction with data collected from onboard instruments to produce terminal state vector.

Field terminal 112 interfaces with local environment 102 to identify object of interest. Once an object of interest is identified, field terminal 112 generates an object state vector. In a preferred embodiment, the object state vector is determined using a terminal state vector. Object state vector may be stored in RAM or nonvolatile data storage media in field terminal. In one embodiment, object state vector is set equal to the terminal state vector. In another embodiment, a terminal state vector is used to generate a fine state vector selector, which allows the user to choose a more accurate state vector to represent the object. In a preferred embodiment, terminal state vector is used to identify a digital map stored in field terminal 112 and having sufficiently high resolution to assist the user in identifying a nearby position corresponding to the object of interest, and this nearby position is used to derive an object state vector. A skilled artisan will recognize that a variety of other methods may be used to determine an object state vector from a terminal state vector.

In a preferred embodiment, field terminal 112 interfaces with local environment 102 to characterize an object of interest by collecting and storing data related to object of interest in field terminal 112 itself. Collected data may comprise one or more of the following: image data; video data; audio data; chemical analysis data; data characterizing physical properties such as temperature, pressure, humidity, wind velocity; luminance; and spectra. Collected data may also comprise other types of data as may be determined by a skilled artisan.

Field terminal 112 may interface to local environment 102 actively or passively. In a preferred embodiment, field terminal 112 interfaces to local environment passively, and collects object data 128 from local environment 102; in this embodiment, object probe 132 is not present. In a preferred embodiment, field terminal collects object data 128 directly from local environment 102. Object data 128 may comprise information signals transmitted by object or physical signals reflected or radiated by object. In a preferred embodiment, direct or indirect sun illumination generates sufficient object data 128 as reflected light for field terminal 112 to collect image data. In a preferred embodiment, object data comprises image, video, and/or audio data. Image and/or video data are collected using a digital camera comprising a lens, sensor, central processor, and digital memory.

In one embodiment, field terminal 112 interfaces to local environment 102 actively. Field terminal 112 transmits object probe 132 to local environment 102 and subsequently receives object data 128 from local environment 102. In one embodiment, object probe 132 comprises a flash illuminator used to illuminate an object in the dark to produce sufficient object data 128 as reflected light for field terminal 112 to collect image data. In another embodiment, a radiofrequency signal stimulates a response from the local environment. In another embodiment, a chemical detector senses the presence of specific chemical compounds and generates chemical composition data.

Field terminal 112 interfaces to system server 116, which makes data handling decisions. A data handling decision relates to transferring data between field terminal 112 and database 120. In one embodiment, a data handling decisions comprises determining which data to transfer from database 120 to field terminal 112 based on user input and properties of local environment 102. In one embodiment, a data handling decision comprises determining which data to transfer from terminal 112 to database 120. Field terminal 112 transmits data 148 to system server 116 and receives data 152 from systems server 116. System server 116 interfaces to database 120 to exchange information related to data handling decisions. System server transmits data 172 to database 120 and receives data 176 from database 120.

In a preferred embodiment of the present invention, field terminal 112 collects object data 128 and creates object data file 159 using object data 128. Field terminal 112 also establishes object state vector and creates object identifier 161 based on object state vector. Object identifier 161 comprises sufficient data to produce object state vector. In one embodiment, object identifier 161 comprises a direct representation of object state vector. In one embodiment, object identifier 161 further comprises a database link to associated object data product 151. This configuration allows object identifier 161 to be used in isolation and to refer to associated object data product 151 as needed. Preferably, field terminal 112 creates object data product 151 comprising object data file 159 and object identifier 161. In one embodiment, object data product 151 comprises a plurality of object data files 159.

In a preferred embodiment, database 120 comprises a plurality of focus data products 157 stored therein. Each of the plurality of focus data products 157 comprises focus identifier 167 and focus index 169. Focus identifier 167 comprises sufficient data to produce focus state vector. In one embodiment, focus identifier 167 comprises a direct representation of focus state vector. In one embodiment, focus identifier 167 further comprises a database link to focus data product 157. Within the database 120, this database link therefore self-references focus data product 157 in which it resides. This link allows a focus identifier to be evaluated separately from its respective focus data product 157, which is advantageous for focus data products 157 comprising a substantial quantity of data. In a preferred embodiment, focus state vector represents the location of a physical item corresponding to focus data product 157. In one embodiment, focus state vector represents a location on the surface of the earth as latitude and longitude coordinates.

In a preferred embodiment, focus index 169 comprises database link 109 to object data product 155. In another preferred embodiment, focus index 169 comprises a plurality of database links 109, and each one of this plurality of database links 109 points to a different object data product 155. Database links 109 comprise sufficient data to retrieve object data products 155 from database 120.

In a preferred embodiment, field-accessed database system 100 collects and stores object data as one or more object data files 159 in field terminal 112. In operation, field terminal 112 generates object state vector, creates object identifier 161, based on object state vector, and produces object data product 151 using object data files 159. Field terminal 112 transmits object identifier 161 to system server 116, to create object identifier 163 residing in system server 116 as a copy of object identifier 161. Object identifier 161 may be stored in RAM or nonvolatile data storage media. Traceability from object identifier object identifier 161 to object identifier 163 is indicated by correspondence pointer 105. Each focus data product 157 comprises corresponding focus identifier 167; focus data product 157 is said to be parent focus data product to its respective focus identifier 167. System server 116 retrieves each focus identifier 167 to create a focus identifier 165 residing in system server 116 as a copy of focus identifier 167. Focus identifier 167 may be stored in RAM or nonvolatile data storage media. Traceability from focus identifier 167 to focus identifier 165 is indicated by correspondence pointer 121. Focus identifier 165 comprises link 123 to focus data product 157.

System server 116 employs selection algorithm to compare object state vector derived from object identifier 163 to each focus state vector derived from focus identifier 165, and system server 116 selects focus identifier 165, and therefore corresponding focus identifier 167 and parent focus data product 157, based on state vector relationships. In one embodiment, state vectors represent location, and system server 116 selects focus identifier 167 having derived focus state vector closest to object state vector. In another embodiment, system server 116 selects a plurality of focus identifiers 167, and therefore a plurality of corresponding parent focus data products 157. In this embodiment, state vectors represent location, and selection algorithm selects each of a plurality of focus identifiers 167 having derived focus state vector within a predetermined distance of object state vector, therefore selecting each of a plurality of parent focus data products 157.

In a preferred embodiment, with respect to each parent focus data product 157, system server 116 instructs database 120 to access corresponding focus index 169 and its database links 109 to identify each object data product 155 linked to focus index 169 and transmit each linked object data product 155 to field terminal 112 to create and store object data product 151 as a copy of object data product 155 in field terminal 112. Correspondence pointer 103 shows traceability of object data product 155 in database 120 to object data product 151 in field terminal 112.

In a preferred embodiment, field terminal 112 identifies object state vector and retrieves object data. Retrieved object data are downloaded to field terminal 112 and stored therein. In operation, field terminal 112 generates object state vector, and creates object identifier 161 based on object state vector. Field terminal 112 transmits object identifier 161 to system server 116, to create object identifier 163 stored in system server 116 as a copy of object identifier 161. System server 116 receives each focus identifier 167 to create a focus identifier 165 stored in system server 116 as a copy of focus identifier 167. System server 116 then compares each retrieved focus identifier 165 to retrieved object identifier 163. System server 116 executes machine readable code to employ selection algorithm to compare object state vector derived from object identifier 163 to each focus state vector derived from focus identifier 165, and system server 116 selects focus identifier 165, and therefore corresponding focus identifier 167 and its parent focus data product 157, based on relationship of each focus state vector to object state vector.

In a preferred embodiment, once focus identifier 167 and therefore parent focus data product 157 is selected, system server 116 instructs field terminal 112 to identify each object data product 151 to be stored in database 120 and transmits each identified object data product 151 to database 120 to create new object data product 155 as a copy of object data product 151 and store object data product 155 in database 120. Correspondence pointer 101 shows traceability from object data product 151 to object data product 155. System server 116 instructs database 120 to link new object data product 155 to focus data product 157 by updating stored data in focus index 169 to include a database link 109 to new object data product 155.

In one embodiment, if no focus data product 157 is selected, user 110 creates new focus data product 153 using field terminal 112, stores focus data product 153 in field terminal 112, and transmits corresponding focus data product 153 to database 120 to create and store new focus data product 157 as copy of focus data product 153 in database 120. Correspondence pointer 113 shows traceability from focus data product 153 to focus data product 157. In a preferred embodiment, new focus data product 157 does not initially comprise any database links 109 to object data products 155. Once a focus data product 157 is created and transmitted to database 120, system server 116 instructs field terminal 112 to identify each object data product 151 to be stored in database 120 and transmits each object data product 151 to database 120 to create new object data product 155 as a copy of object data product 151. System server 116 instructs database 120 to link 109 new object data product 155 to focus data product 157 by updating stored data in focus index 169 to include a database link to each new object data product 155.

In another embodiment of the present invention, a plurality of focus data products 157 are retrieved from database 120 and stored in field terminal 112 as new focus data products 153, which are copies of focus data products 157. Correspondence pointer 111 shows relationship between focus data product 157 and focus data product 153. In this embodiment, handling decisions are performed in field terminal 112 substantially as previously performed in system server 116 in the description provided hereinabove.

Figure 1B:
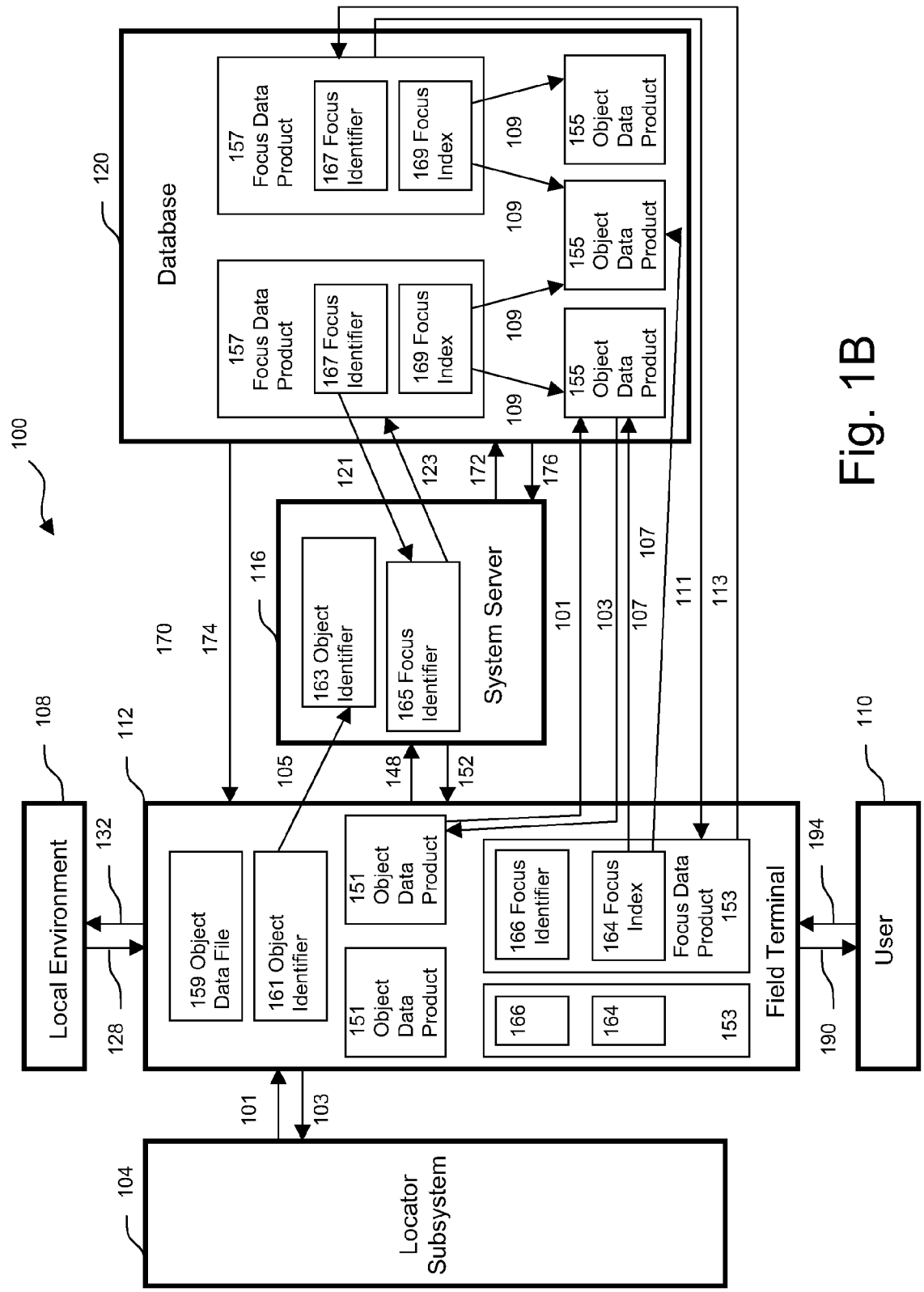
FIG. 1B is an architecture diagram that shows further interrelationships of subsystems of a field-accessed database system and data items used by subsystem, according to the present invention.

FIG. 1B illustrates by way of example the functional system architecture of a preferred embodiment of the present invention, using an architecture diagram that further shows interrelationships of subsystems of a field-accessed database system and data items used by subsystem. Interrelationships shown in FIGS. 1A and 1B may occur simultaneously. The diagram in FIG. 1B further illustrates data exchange among constituent subsystems in field-accessed database system 100.

In a preferred embodiment of the present invention, field terminal 112 comprises a plurality of focus data products 153 stored therein. Each of the plurality of focus data products 153 comprises focus identifier 166 and focus index 164. Focus identifier 166 comprises sufficient data to produce focus state vector. Preferably, focus identifier 167 comprises a direct representation of focus state vector.

In one embodiment, focus index 164 comprises database link 107 to object data product 155 residing in database 120. In a preferred embodiment, focus index 164 comprises a plurality of database links 107, each of this plurality of database links 107 pointing to an object data product 155. Database links 107 comprise sufficient data to retrieve object data products 155 from database 120. Thus, in this embodiment, focus data product 153 residing in field terminal 112 comprises database links 107 to object data products 155 residing in database 120.

Figure 1C:
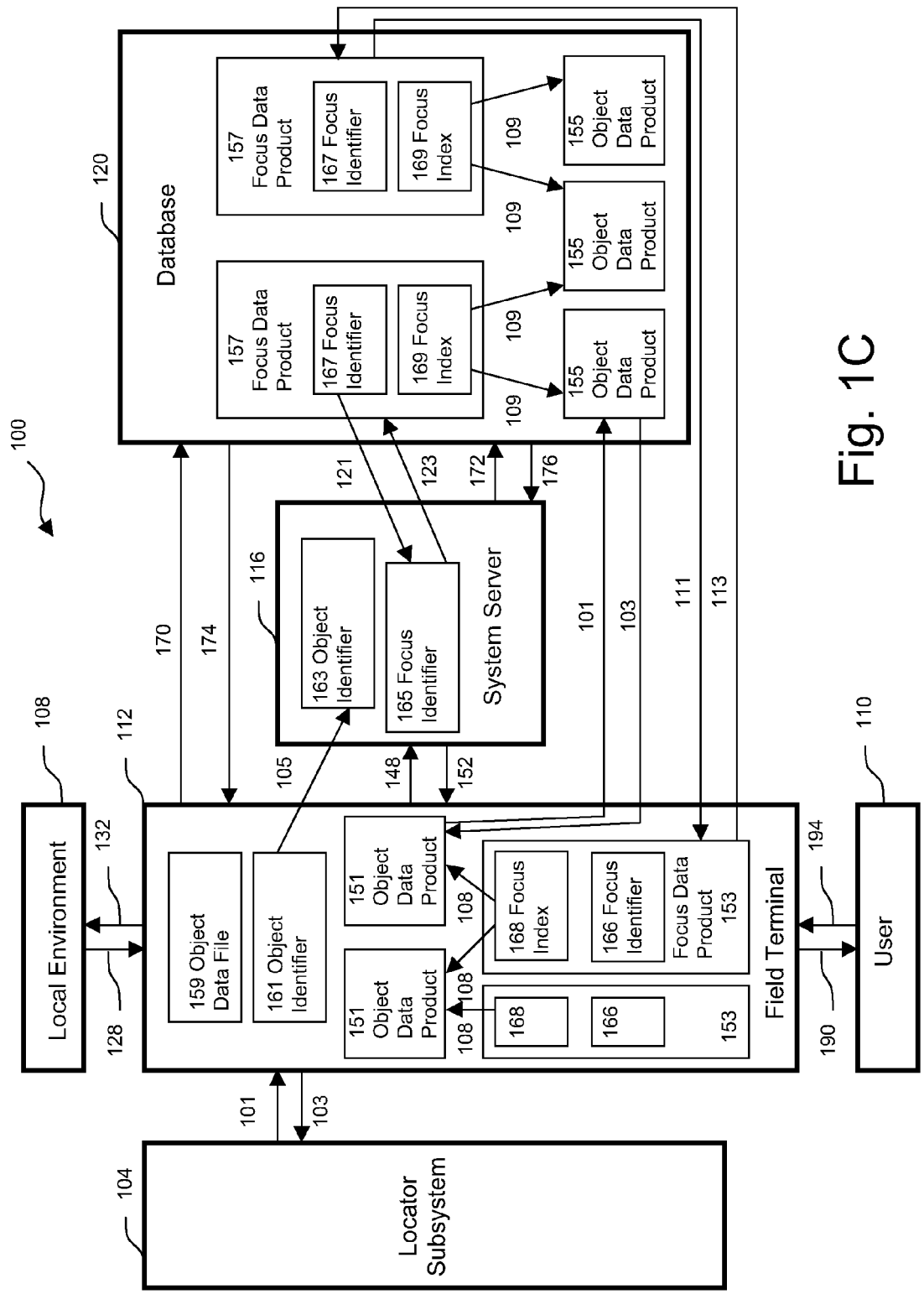
FIG. 1C is an architecture diagram that shows still further interrelationships of subsystems of a field-accessed database system and data items used by subsystem, according to the present invention.

FIG. 1C illustrates by way of example the functional system architecture of a preferred embodiment of the present invention, using an architecture diagram that still further shows interrelationships of subsystems of a field-accessed database system and data items used by subsystem. Interrelationships shown in FIGS. 1A, 1B, and 1C may occur simultaneously. The diagram in FIG. 1C further illustrates data exchange among constituent subsystems in field-accessed database system 100.

In a preferred embodiment of the present invention, field terminal 112 comprises a plurality of focus data products 153. Each of the plurality of focus data products 153 comprises focus identifier 166 and focus index 168. Focus identifier 166 comprises sufficient data to produce focus state vector.

In one embodiment, focus index 168 comprises database link 108 to object data product 151, stored in field terminal 112. In a preferred embodiment, focus index 168 comprises a plurality of database links 108, each of this plurality of database links 108 pointing to an object data product 151. Database links 108 comprise sufficient data to identify object data products 151 in field terminal 112. Thus, in this embodiment, focus data product 153 residing in field terminal 112 comprises database links to object data products 151 residing in field terminal 112.

In another embodiment, focus data product 153 residing in field terminal 112 comprises database links 108 to object data products 151 residing in field terminal 112 and database links 107 to object data products 155 residing in database 120.

In preferred embodiments of the invention, object data products and focus data products are be stored in RAM or nonvolatile data storage media in field terminal 112, system server 116, and/or database 120, at different steps in the processes of storing, retrieving and/or sharing data using a field-accessed database system.

Figure 2:
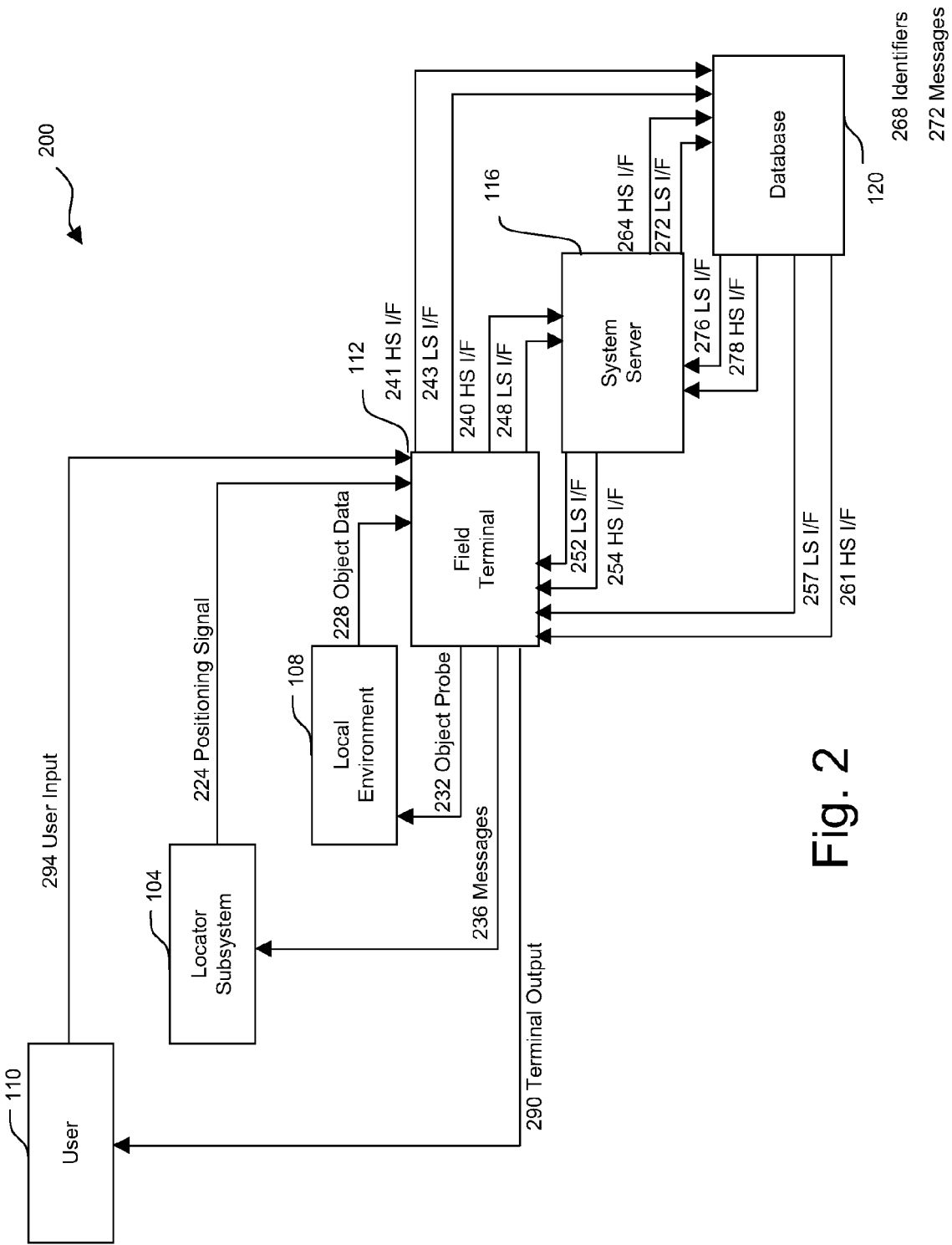
FIG. 2 is an interface diagram that shows interfaces between subsystems of field-accessed database system, according to the present invention.

FIG. 2 illustrates by way of example how each subsystem of a field-accessed database system 200 interfaces to each of the other subsystems. Interfaces may be digital electronics, digital wireless, analog electronics, analog wireless, optical coupling, mechanical coupling, and other approaches to physical coupling. Electronic data signals may be transmitted using wireless or wired connections. Digital data signals may be transmitted using, for example, Ethernet (e.g. 10BASE-T, 100BASE-T, 1000BASE-T), Internet (e.g., IPv4, IPv6), wireless communication (e.g. 3G, 4G), or other protocols. It will be apparent to a skilled artisan that the incumbent network infrastructure available to a large population of users is sufficient to enable practice of the present invention.

In a preferred embodiment, field terminal 112 interfaces to user 110 by receiving user input over interface 294 from user 110 and by providing terminal output over interface 290 to user 110. User input may comprise touch pad entry data, voice entry data, keyboard entry data, or other types of input data. Terminal output may comprise image display, video display, audio, or other types of output.

Field terminal 112 interfaces to locator subsystem 104 by receiving positioning signals over interface 224. In a preferred embodiment, these positioning signals comprise signals transmitted from GPS satellites. In another embodiment, field terminal interfaces to locator subsystem 104 by transmitting messages over interface 236; these messages instruct locator subsystem to issue positioning signals over interface 224, which positioning signals comprise signals designed for a specific application. A skilled artisan would readily know how to design positioning signals for a specific application.

Field terminal 112 interfaces to local environment 102 by receiving object data over interface 228. In preferred embodiment, field terminal 112 identifies terminal object residing in local environment and collects object data corresponding to terminal object. In one embodiment, object data comprises image, video, and/or audio data. Preferably, object data comprises analog data digitized by field terminal 112. In another embodiment, object data comprises digital data generated by local environment 102 and transmitted to field terminal 112 using a digital signal over interface 228. In one embodiment, field terminal 112 transmits object probe 232 to local environment 102 to stimulate or aid in the generation of object data. In one embodiment, object probe is a flash that illuminates terminal object residing in local environment 102. In another embodiment, object probe 232 is a radiofrequency signal that stimulates the generation and transmission of a digital signal comprising object data.

In a preferred embodiment, field terminal 112 interfaces to system server 116 over low-speed interface 248 to transmit messages comprising requests and/or data. System server 116 interfaces to database 120 over low-speed interface 272 to transmit messages comprising requests and/or data. Database 120 interfaces to system server 116 over low-speed interface 276 to transmit messages comprising requests and/or data. System Server 116 interfaces to field terminal 112 over low-speed interface 252 to transmit messages comprising requests and/or data. Transmitted messages may include object identifiers, focus identifiers, and therefore associated state vector data.

In one embodiment, field terminal 112 interfaces directly with database 120 to send and receive messages. In this embodiment, field terminal 112 interfaces to database 120 over low-speed interface 243 to transmit messages comprising requests and/or data, and database 120 interfaces to field terminal 112 over interface low-speed 257 to transmit messages comprising requests and/or data.

Data products are transmitted over high-speed interfaces. In a preferred embodiment, data products are transmitted directly between field terminal 112 and database 120. In this embodiment, to upload data from field terminal 112 to database 120, field terminal 112 transmits data products to database 120 over high-speed interface 241; to download data from database 120 to field terminal 112, database 120 transmits data products to field terminal 112 over high-speed interface 261. Data products transmitted from one subsystem to another may be an object data product, a focus data product, a data index product, a focus index product, a fine selector data product, or other data products; these data products are further discussed in the description accompanying FIGS. 3-16 hereinbelow.

In another embodiment, data products are relayed between field terminal 112 and database 120 using system server 116. To upload data products from field terminal 112 to database 120, a first data product may is transmitted from field terminal 112 to system server 116 over interface 240, and subsequently transmitted from system server 116 to database 120 over interface 264. To download data products from database 120 to field terminal 112, a second data product is be transmitted from database 120 to system server 116 over interface 278, and subsequently transmitted from system server 116 to field terminal 112 over interface 254.

In one embodiment, field-accessed database system reserves bandwidth of a sufficiently high quality for low-speed message interfaces 248, 272, 243, 276, 252, and 257, and reserves bandwidth of sufficiently high flexibility for high-speed data product interfaces 240, 264, 241, 278, 254, 261. These low-speed message interfaces may comprise dedicated, circuit-switch interfaces that offer minimal delay in exchanging data. These high-speed data product interfaces may comprise IP circuits that offer flexibility in bandwidth sharing but may present delays in exchanging data. In one embodiment, low-speed and high-speed interfaces between used to transmit data from a first subsystem to a second subsystem are the same logical interface. In another embodiment, low-speed and high-speed interfaces between used to transmit data from a first subsystem to a second subsystem are the same physical interface.

In a preferred embodiment, interfaces 241, 243, 240, 248, 252, 254, 257, and 261 occur over a network that includes wireless connections to field terminal 112, and wired connections to system server 116 and database 120, and interfaces 264, 272, 276, and 278 between system server 116 and database 120 occur over a network that includes wired connections. In one embodiment, interfaces 241, 243, 240, 248, 252, 254, 257, and 261 connect to field terminal 112 using a network that interfaces to field terminal 112 wirelessly. Preferably, interfaces 241, 243, 240, 248, 252, 254, 257, and 261 connect to system server 116 and database 120 using only wired connections for the final physical connection to these elements.

Subsystems described in FIGS. 1 and 2 are show as distinct for functional purposes. In one embodiment, system server 116 and database 120 may reside in a single subsystem. In another embodiment, database 120 may comprise a number of distinct physical subsystems configured in a distributed architecture, as in the case of the Internet or World Wide Web. A skilled artisan will readily know how to implement the function architecture in a physical system.

FIG. 3 is a diagram showing object data product 300, according to a preferred embodiment of the present invention. Preferably, object data product 300 is stored in RAM or nonvolatile data storage media in field terminal 112, system server 116, and/or database 120, at different steps in the processes of storing, retrieving and/or sharing data using a field-accessed database system 100. Object data product 300 comprises the following member classes: title 305; brief description 310, object identifier 320, detailed description 330, thumbnail image 340, index of data items 350, and a plurality of N data items labeled from 1 to N as data item 1 360 to data item N 390. Index of data items 360 comprises a list of links to data items 1 to N. In one embodiment, object data product 300 comprises a set of files, and data item 350 is a stand alone data file in this set of files. In another embodiment, object data product 300 is a single data file, and each data item 350 is a segment of this data file. Each member of object data product 300 relates to an object member. An object data product 300 is not necessarily limited to a pre-determined number of data files, and each constituent data file is not necessarily limited to a pre-determined data type. In one embodiment, object data product 300 has a pre-determined data structure, comprising a fixed number of data item 350, each data item 350 assigned a specific data type. In another embodiment, object data product 300 has a variable data structure, comprising a variable number of data items 350, each data item 350 having a non-predetermined data type.

FIG. 4 is a diagram showing focus data product 400, according to a preferred embodiment of the present invention. Preferably, focus data product 400 is stored in RAM or non-volatile data storage media in field terminal 112, system server 116, and/or database 120, at different steps in the processes of storing, retrieving and/or sharing data using a field-accessed database system 100. Focus data product 400 comprises the following member classes: title 405, focus identifier 410, focus index 420, brief description 430, detailed description 440, and thumbnail image 450. Focus index 420 comprises a list of database links to object data products 107, 108, 109. In a preferred embodiment, database links 107, 109 point to object data products 155 residing in database 120. In another embodiment, database links 108 point to object data products 151 residing in field terminal 112.

FIG. 5 is a diagram showing data index product 500, according to a preferred embodiment of the present invention. Preferably, data index product 500 is stored in RAM or non-volatile data storage media in field terminal 112, system server 116, and/or database 120, at different steps in the processes of storing, retrieving and/or sharing data using a field-accessed database system 100. Data index product comprises the following member classes: title 505, brief description 510, detailed description 530, thumbnail image 540, and a plurality of M data items labeled from 1 to M as data item 1 550 to data item M 590. Each data item further comprises thumbnail image 552, title 554, brief description 556, and database link 558. In a preferred embodiment, database links 558 point to object data products 155 residing in database 120. In another embodiment, database links 558 point to object data products 151 residing in field terminal 112. Database links 558 in data index product 500 correspond to database links 107, 108, and 109, according to the particular details of an implementation architecture.

FIG. 6 is a diagram showing focus index product 600, according to a preferred embodiment of the present invention. Preferably, focus index product 600 is stored in RAM or nonvolatile data storage media in field terminal 112, system server 116, and/or database 120, at different steps in the processes of storing, retrieving and/or sharing data using a field-accessed database system 100. Focus index product comprises the following member classes: title 605, brief description 610, detailed description 630, thumbnail image 640, and a plurality of Q focus items labeled from 1 to Q as focus item 1 650 to data item Q 690. A focus item corresponds to a reference point of interest and therefore only one focus data product. Each focus item further comprises thumbnail image 652, title 654, brief description 656, and database link 658. In a preferred embodiment, database links 658 point to focus data products 157 residing in database 120. In another embodiment, database links 658 point to focus data products 153 residing in field terminal 112.

In the descriptions accompanying FIGS. 7-16, references are made to sets of data product. Each data product that belongs to a set of data products is an element of this set.

Figure 7:
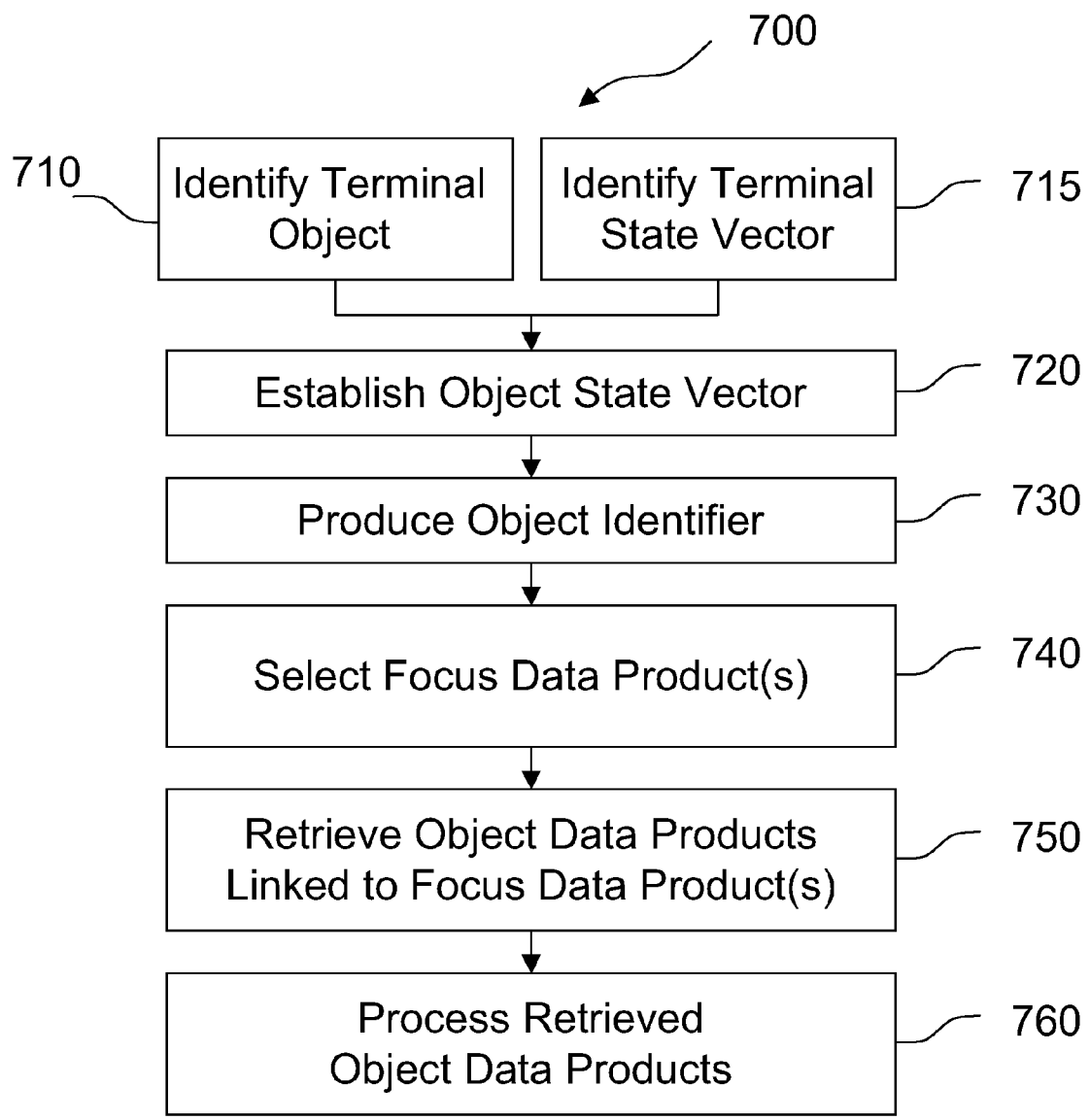
FIG. 7 is a flow diagram illustrating a first method of retrieving and processing object data products that relate to a terminal object.

FIG. 7 is a flow diagram illustrating a method 700 of retrieving data from a database in a field-accessed database system 100, according to a preferred embodiment of the present invention. Method 700 identifies and employs an object state vector to identify and retrieve object data products 155 stored in database 120, store object data products 151 in field terminal 112, and process downloaded object data products 151 for user access. At step 710, a first field terminal 112 identifies terminal object; thus, method 700 selects a physical object as a point of interest using a first field terminal 112, wherein this first field terminal 112 is a subsystem of field-accessed database system 100. At step 715, terminal 112 establishes terminal state vector. Field terminal 112 establishes terminal state vector by retrieving positioning signal from locator subsystem 104 over interface 224, and using positioning signal to calculate terminal state vector. Steps 710 and 715 may occur in either order or simultaneously. In one embodiment, step 710 is accomplished by pointing field terminal 112 at object. In another embodiment, step 710 is accomplished by retrieving a digital map based on terminal location from system server 116 and identifying terminal object on retrieved digital map.

At step 720, field terminal 112 establishes object state vector. Preferably, object state vector is stored in RAM or nonvolatile data storage media in field terminal 112. In one embodiment, object state vector is set equal to terminal state vector. In another embodiment, object state vector is calculated based on position identified on digital map. At step 730, terminal produces object identifier 161, which is a data item that identifies object state vector.

At step 740, field terminal 112 employs object identifier 161 to select at least one focus data product 157 stored in database 120. Each focus data product 157 comprises focus identifier 167 that uniquely identifies the state vector associated with focus data product 157. In a preferred embodiment, field terminal 112 transmits object identifier 161 from field terminal 112 to system server 116 over interface 248 to create duplicate object identifier 163 in system server 116. Preferably, duplicate object identifier 163 is a copy of initial object identifier 161. System server 116 retrieves each focus identifier 167 from database 120 over interface 276 to create and store each duplicate focus identifier 165 in system server 116. Preferably, duplicate focus identifier 165 is a copy of initial focus identifier 167. Thus, object identifier 163 is traces to object identifier 161, and focus identifier 165 traces to focus identifier 167.

In one embodiment, system server 116 executes machine readable code employing selection algorithm to compare an object state vector derived from object identifier 163 to a focus state vector derived from focus identifier 165. System server selects a focus identifier 165, and therefore corresponding focus identifier 167 and its parent focus data products 157, based on the relationship of the focus state vector to the object state vector. Selection algorithms are referenced throughout the present disclosure, and it will be apparent to a skilled artisan that a selection algorithm employed in one embodiment of the present invention is not necessarily the same selection algorithm employed in another embodiment. In a preferred embodiment, system server 116 executes machine readable code to process a selection algorithm to produce a set of focus data products 157 from a plurality of focus data products 157, each of this produced set of focus data products 157 comprising a respective focus state vector, wherein the selection algorithm selects a focus data product 157 to be an element of the produced set if and only if its respective focus state vector satisfies predetermined relationship criteria with respect to the object state vector established at step 720. In one embodiment, selection algorithm selects a focus data product 157 to be an element of the produced set if its respective focus state vector satisfies predetermined relationship criteria with respect to the object state vector established at step 720, and may include other focus data products 157 that meet other selection criteria. In another embodiment, selection algorithm selects a focus data product 157 to be an element of the produced set only if its respective focus state vector satisfies predetermined relationship criteria with respect to the object state vector established at step 720, but the produced set may not include all focus data products that meet the selection criteria. In a preferred embodiment, system server 116 maintains an index of the produced set of focus data products as a set data product stored therein. This set data product comprises a list of each member focus data product, wherein each entry in the list is accompanied by a link to its respective data product. In a preferred embodiment, this set data product is a focus index product 600. More generally, a set data product is stored in field-accessed database system. Preferably, the plurality of focus data products 157 employed to produce the set of focus data products 157 comprises all focus data products 157 stored in database 120. The produced set of focus data products 157 may comprise one focus data product 157, may comprise more than one focus data product 157, or may comprise no focus data products 157. A selected focus data product 157 comprises focus index 169. Focus index 169 comprises database links 109 to object data products 155.

In a preferred embodiment, at step 750, field terminal 112 retrieves from database 120 all object data products 155 linked to each element of the set of focus data products 157 produced at step 740, and stores retrieved data as object data product 151 therein. The retrieved object data products 155 are identified using focus index 169. In another embodiment, field terminal 112 selects a set of object data products 155 linked to the set of focus data products 157 produced at step 740, downloads from database 120 one or more of this selected set of object data products 155, and stores retrieved data as object data product 151 therein. In one embodiment, field terminal 112 selects a set of object data products 155 based on a filter. By way of example, a filter may limit selected object data products 155 to image, video, audio, text, and/or hybrid data. If set of selected focus data products 157 is the null set, field terminal 112 downloads no object data products 155.

In one embodiment, system server 120 alerts field terminal 112 that object data products 155 linked to focus index 169 are available to download. Field terminal 116 instructs database 120 to transmit object data products 155 over high-speed data interface 261. Field terminal 112 receives object data products 155 and stores them locally as object data products 151 in non-volatile solid-state memory or a micro-hard-drive. In a preferred embodiment, an object data product 151 comprises data member classes as defined for object data product 300. In other embodiments of the invention, object data product 151 comprises a subset of data member classes as defined for object data product 300.

At step 760, field terminal 112 processes retrieved and stored object data products 151 for user access. More particularly, in a preferred embodiment, field terminal 112 displays images, shows video, and/or plays audio data items, thereby rendering and delivering user-interpretable output to user 110 over interface 290. In a preferred embodiment of the present invention, database 120 comprises object data product 155 previously uploaded from a second field terminal and stored in database 120, which object data product 155 is linked to at least one focus data product 157 selected from within the set of focus data products 157 established at step 740, where linking is established via database link 109.

Figure 8:
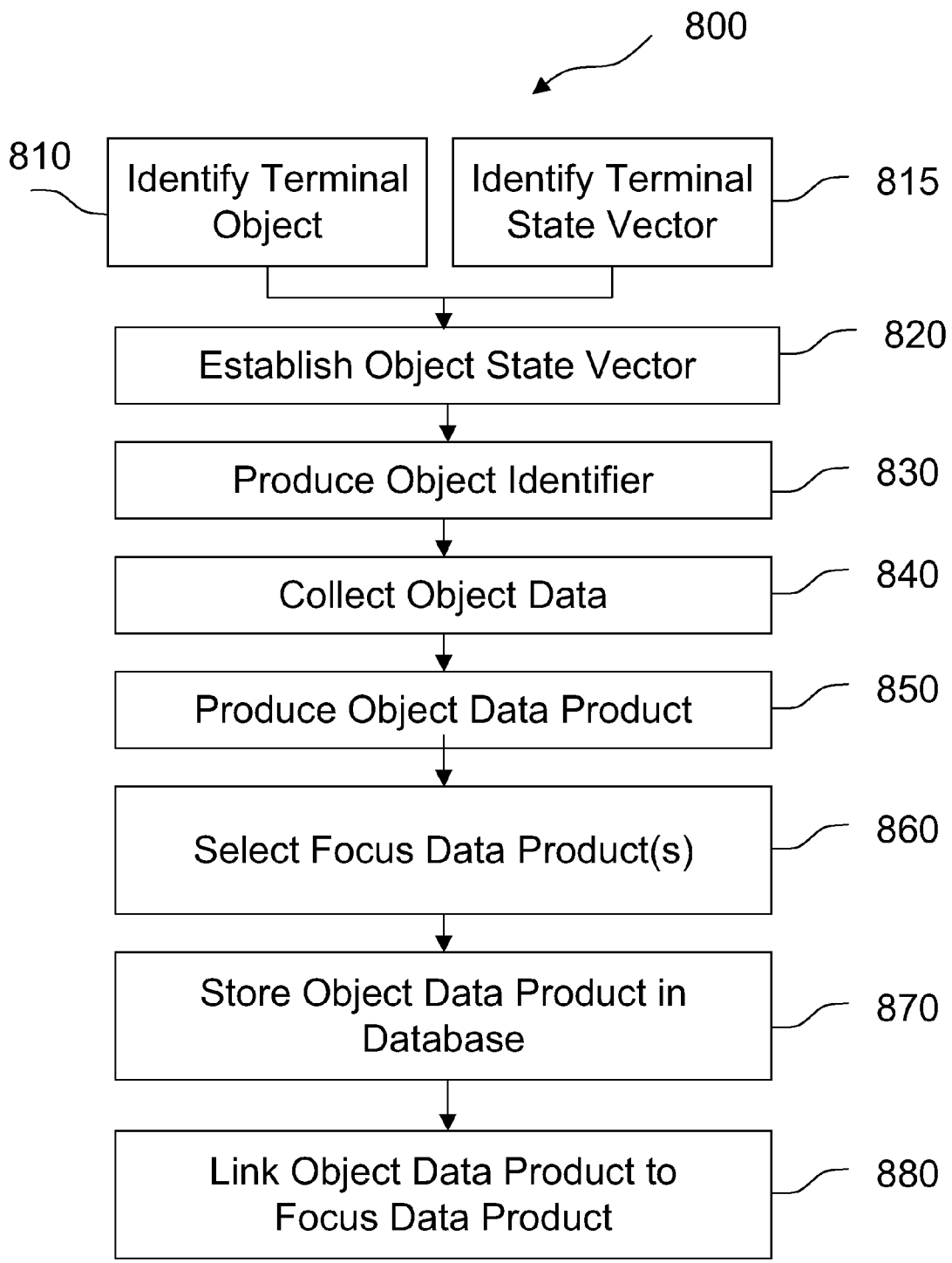
FIG. 8 is a flow diagram illustrating a method of storing object data products that relates to a terminal object.

FIG. 8 is a flow diagram illustrating a method of retrieving data from a database in a field-accessed database system 100, according to a preferred embodiment of the present invention. Method 800 identifies an object as a point of interest, collects object data, stores object data in field terminal 112, produces an object data product 151, identifies an object state vector corresponding to object, uploads object data product 151 to database 120 and stores it as object data product 155, and employs object state vector to link object data product to an appropriate focus data product for later recall. At step 810, a first field terminal 112 identifies terminal object; thus, method 800 selects a physical object using a first field terminal 112. At step 815, field terminal 112 establishes terminal state vector stored therein. In a preferred embodiment, field terminal 112 establishes terminal state vector by retrieving positioning signal from locator subsystem 104 over interface 224, and using positioning signal to calculate terminal state vector. Steps 810 and 815 may occur in either order or simultaneously. At step 820, terminal 112 establishes object state vector stored therein. At step 830, field terminal 112 produces object identifier 161, which is a data item that uniquely identifies object state vector. At step 840, field terminal 112 collects object data 128 from local environment 102 over interface 228 and stores object data 128 in field terminal 112. In a preferred embodiment, object data comprises image, video, and/or audio data. At step 850, field terminal 112 produces object data product 151. In a preferred embodiment, object data product 151 comprises data member classes as defined for object data product 300. In other embodiments of the invention, object data product 151 comprises a subset of data member classes as defined for object data product 300.

At step 860, field terminal 112 employs object identifier 161 from object data product 151 to select at least one focus data product 157 stored in database 120. Each focus data product 157 comprises focus identifier 167 that identifies the state vector associated with focus data product 157. In a preferred embodiment, field terminal 112 transmits object identifier 161 to system server 116 over interface 248 to create object identifier 163 stored in system server 116. System server 116 retrieves each focus identifier 167 from database 120 over interface 276 to create each focus identifier 165 in system server 116. Thus, object identifier 163 traces to object identifier 161, and focus identifier 165 traces to focus identifier 167.

In one embodiment, system server 116 executes machine readable code employing selection algorithm to compare object state vector derived from object identifier 163 to a focus state vector derived from focus identifier 167. System server 116 selects a focus identifier 165, and therefore corresponding focus identifier 167 and its parent focus data product 157, based on relationship of the focus state vector to object state vector.

In a preferred embodiment, system server 116 executes machine readable code to process a selection algorithm to produce a set of focus data products 157 from a plurality of focus data products 157, each of the produced set focus data products 157 comprising a respective focus state vector, wherein system server 116 selects a focus data product 157 to be an element of the produced set if and only if its respective focus state vector satisfies predetermined relationship criteria with respect to the object state vector established at step 820. In one embodiment, selection algorithm selects a focus data product 157 to be an element of the produced set if its respective focus state vector satisfies predetermined relationship criteria with respect to the object state vector established at step 820, and may include other focus data products 157 that meet other selection criteria. In another embodiment, selection algorithm selects a focus data product 157 to be an element of the produced set only if its respective focus state vector satisfies predetermined relationship criteria with respect to the object state vector established at step 820, but the produced set may not include all focus data products that meet the selection criteria. Preferably, the plurality of focus data products 157 employed to produce the set of focus data products 157 comprises all focus data products 157 stored in database 120. The produced set of focus data products 157 may comprise one focus data product 157, may comprise more than one focus data product 157, or may comprise no focus data products 157. A selected focus data product 157 comprises focus index 169.

At step 870, field terminal 112 stores object data product 151 in database 120; thus, field terminal 112 uploads to database 120 object data product 151. In one embodiment, system server 116 alerts database 120 that object data product 151 is available for storage. Database 120 instructs field terminal 116 to transmit object data product 151 over high-speed data interface 241. Database 120 receives an object data product 151 and stores it as new object data product 155.

At step 880, database 120 identifies a focus data product 157 having respective focus index 169, and database 120 updates data stored in focus index 169 to include database link 109 to new object data product 155, thus linking object data product 155 to focus data product 157. Focus index 169 may also comprise database links 109 to pre-existing object data products 155. Therefore, in a preferred embodiment, database linking is accomplished by linking object data product 155 to linked focus data product 157 in database 120, wherein this linked focus data product 157 has been selected from within the previously selected set of focus data products established at step 860. In a preferred embodiment, the new object data product 155 is linked to each element of the set of focus data products established at step 860.

In a preferred embodiment, if the set of selected focus data products 157 is the null set, system 100 produces a new focus data product 157 comprising a focus state vector equal to object state vector, in which focus index 169 initially has no database links, and stores new focus data product 157 in database 120. With the new focus data product 157, database linking is accomplished by linking object data product 157 in database 120 to the new focus data product 157, and in particular by updating data stored in focus index 169 to include database link 109 to new object data product 155. In one embodiment, new focus data product 153 is produced in field terminal, uploaded to database 120, and stored in database 120 to create new focus data product 157. In another embodiment, new focus data product 157 is produced in database 120 initially.

In a preferred embodiment of the present invention, database 120 comprises an object data product 155 previously uploaded from a second field terminal to database 120 and stored in database 120, which object data product 155 is linked to at least one focus data product 157 selected from within set of focus data products 157 established at step 860, where linking is established via database link 109.

Figure 9:
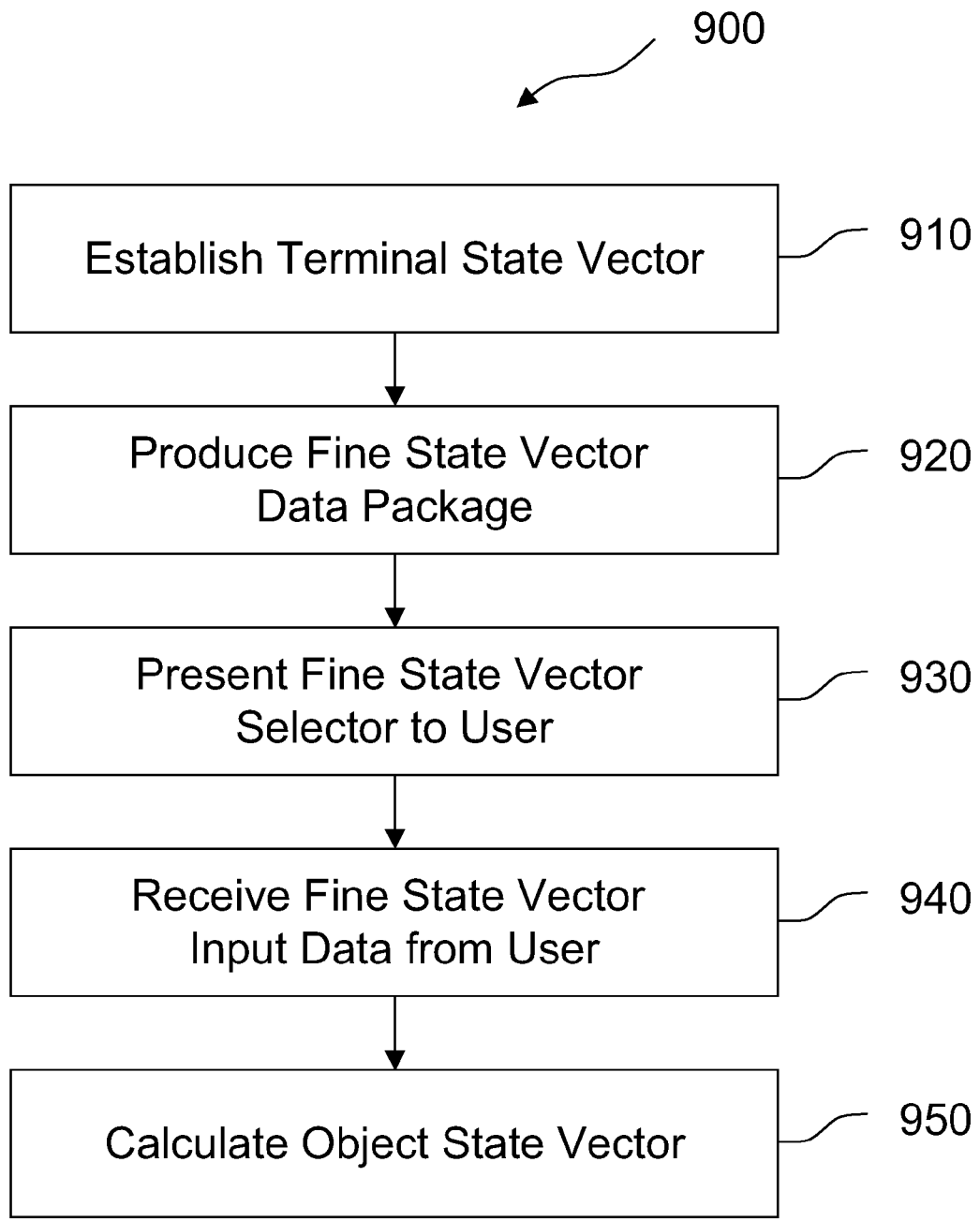
FIG. 9 is a flow diagram illustrating a method to determine object state vector using data residing in field terminal.

FIG. 9 is a flow diagram illustrating a first method 900 of establishing an object state vector, according to a preferred embodiment of the present invention. At step 910, field terminal 112 establishes terminal state vector. Step 910 may be omitted if terminal state vector is already established. At step 920, field terminal 112 produces fine state vector data package and stores it therein. In a preferred embodiment, terminal state vector comprises terminal location, and fine state vector data package comprises a digital map centered on terminal location. At step 930, field terminal 112 presents fine state vector selector to user 110 as terminal output over interface 290. At step 940, field terminal 112 receives state vector input data from user as user input over interface 294. User input may comprise keyboard entry, touch screen selection, or speech recognition selection. At step 950, field terminal 112 employs user input and fine state vector selector to calculate object state vector. Therefore, in a preferred embodiment, a physical object is selected as a point of interest using a state vector selection algorithm derived using terminal state vector. Preferably, terminal state vector and object state vector reside in field terminal 112 as stored data.

Figure 10:
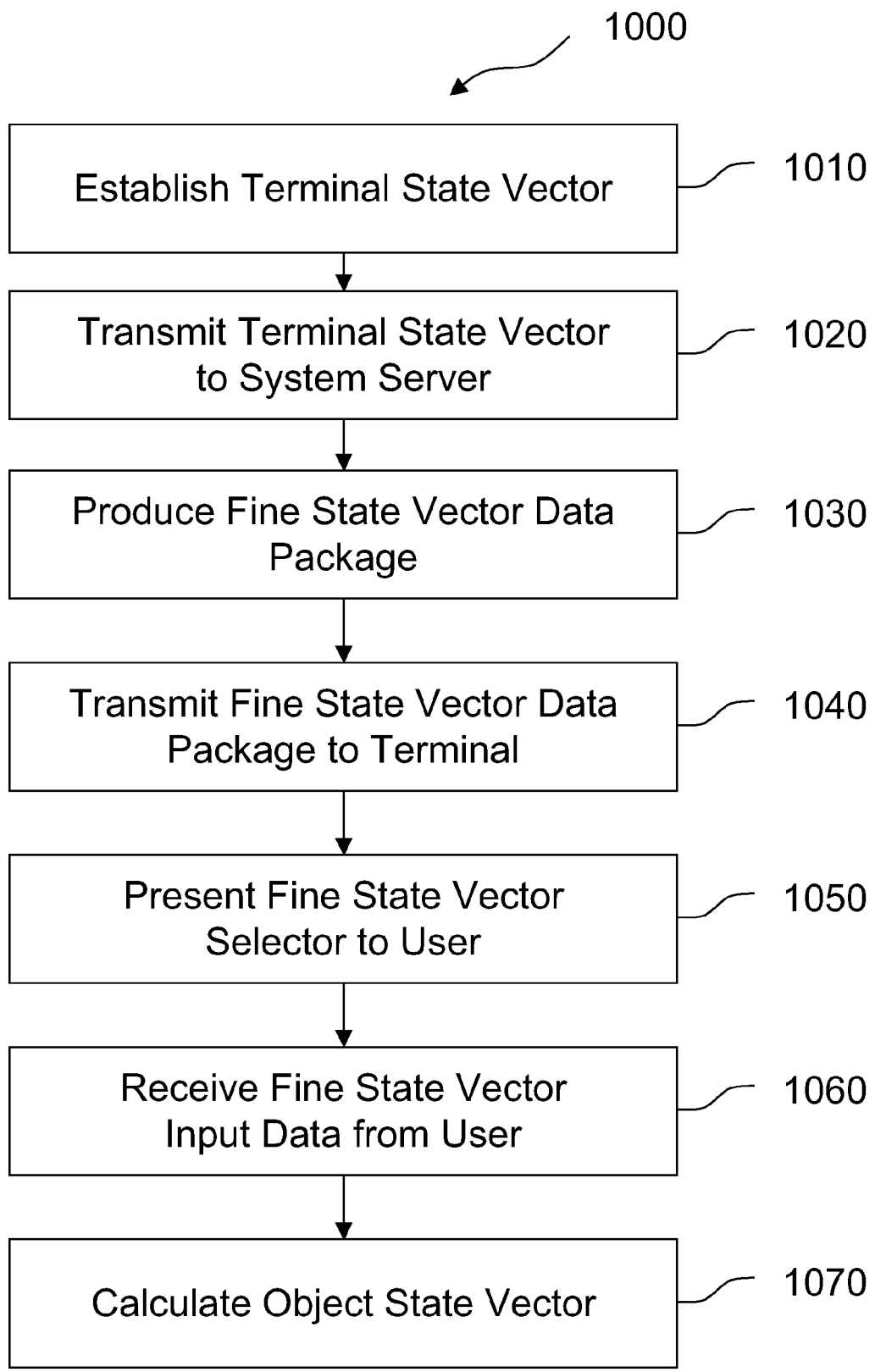
FIG. 10 is a flow diagram illustrating a method to determine object state vector using data retrieved from a system server.

FIG. 10 is a flow diagram illustrating a second method 1000 of establishing an object state vector, according to a preferred embodiment of the present invention. At step 1010, field terminal 112 establishes terminal state vector. Step 1010 may be omitted if terminal state vector is known. At step 1020, field terminal 112 transmits terminal state vector to system server 116. At step 1030, system server 116 produces fine state vector data package comprising data stored in systems server 116. In a preferred embodiment, terminal state vector comprises terminal location, and fine state vector data package comprises a digital map centered on terminal location. At step 1040, system server 116 transmits fine state vector data package to field terminal 112, and find state vector data package is stored in field terminal 112. At step 1050, field terminal 112 presents fine state vector selector to user 110 as terminal output over interface 290. At step 1060, field terminal 112 receives state vector input data from user as user input over interface 294. User input may comprise keyboard entry, touch screen selection, or speech recognition selection. At step 1070, field terminal 112 uses user input and fine state vector selector to calculate object state vector. Therefore, in a preferred embodiment, a physical object is selected as a point of interest using a state vector selection algorithm derived using terminal state vector, wherein the state vector selection algorithm is retrieved by field terminal 112 from system server 116. Preferably, terminal state vector and object state vector reside in field terminal 112 as stored data.

Figure 11:
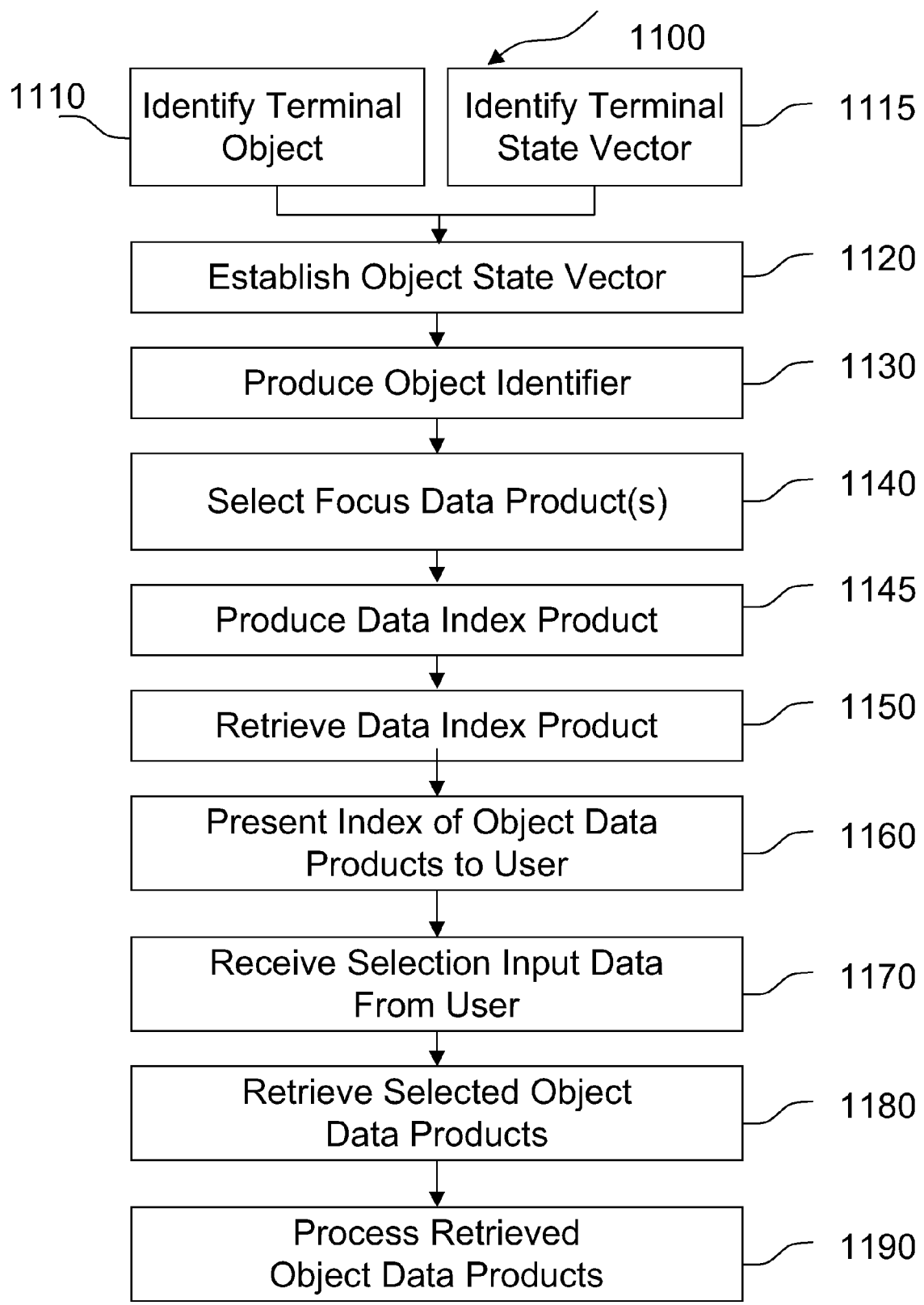
FIG. 11 is a flow diagram illustrating a method of retrieving and processing data from a database in a field-accessed database system, utilizing a data index product that a user employs to select desired data.

FIG. 11 is a flow diagram illustrating a method 1100 of retrieving data from a database in a field-accessed database system 100, according to a preferred embodiment of the present invention. Method 1100 establishes and employs an object state vector to retrieve a data index product 500 of object data products 155 stored in database 120, receives selection input from user 110, downloads to a field terminal 112 selected object data products 155 from database 120, and processes retrieved object data products 155 for user access. At step 1110, a first field terminal 112 identifies terminal object. At step 1115, field terminal 112 establishes terminal state vector. Steps 1110 and 1115 may occur in either order or simultaneously. At step 1120, terminal 112 establishes object state vector. In one embodiment, object state vector is set equal to terminal state vector. In another embodiment, object state vector is calculated based on position identified on digital map. At step 1130, terminal produces object identifier 161, which is a data item that identifies object state vector. Preferably, terminal state vector, object state vector, and object identifier reside in field terminal 112 as stored data.

At step 1140, field terminal 112 employs object identifier 161 to select focus data product 157 stored in database 120. Each focus data product 157 has a corresponding focus identifier 167 that identifies the state vector associated focus data product 157. In a preferred embodiment, field terminal 112 transmits object identifier 161 to system server 116 over interface 248 to create object identifier 163 stored in systems server 116. System server 116 retrieves each focus identifier 167 from database 120 over interface 276 to create each focus identifier 165 stored in system server 116.

In one embodiment, system server 116 executes machine readable code employing selection algorithm to compare object state vector derived from object identifier 163 to each focus state vector derived from focus identifier 165. Object identifier 163 traces to object identifier 161, and focus identifier 165 traces to focus identifier 167. Selection algorithm selects focus identifier 165, and therefore corresponding focus identifier 167 and its parent focus data product 157, based on relationship of each focus state vector to object state vector.

In a preferred embodiment, system server 116 executes machine readable code that processes a selection algorithm to produce a set of focus data products 157 from a plurality of focus data products 157, each of this produced set of focus data products 157 comprising a respective focus state vector, wherein the selection algorithm selects a focus data product 157 to be an element of the produced set if and only if its respective focus state vector satisfies predetermined relationship criteria with respect to the object state vector established at step 1120. In one embodiment, system server 116 selects a focus data product 157 to be an element of the produced set if its respective focus state vector satisfies predetermined relationship criteria with respect to the object state vector established at step 1120, and may include other focus data products 157 that meet other selection criteria. In another embodiment, selection algorithm selects a focus data product 157 to be an element of the produced set only if its respective focus state vector satisfies predetermined relationship criteria with respect to the object state vector established at step 1120, but the produced set may not include all focus data products that meet the selection criteria. In a preferred embodiment, system server 116 maintains an index of the produced set of focus data products as a set data product stored therein comprising a list of each element data product, wherein each entry in the list is accompanied by a link to its respective data product. In a preferred embodiment, this set data product is a focus index product 600. Preferably, the plurality of focus data products 157 employed to produce the set of focus data products 157 comprises all focus data products 157 stored in database 120. The produced set of focus data products 157 may comprise one focus data product 157, may comprise more than one focus data product 157, or may comprise no focus data products 157. Selected focus data product 157 comprises corresponding selected focus index 169. Focus index 169 comprises database links 109 to object data products 155.

In one embodiment, at step 1145, system server 116 produces data index product 500 stored therein by populating data index product 500 member classes with data drawn from the set of focus data products 157 produced at step 1140 and the object data products 155 linked to each element from the produced set of focus data products. In one embodiment, focus data products are ranked from highest to lowest ranking according to a ranking algorithm. For example, if a focus data product 157 is selected according to the proximity of its focus state vector to an object state vector, based on location, then the focus data product 157 having a location closest to the object has the highest ranking. Title 505, brief description 510, detailed description 530, and thumbnail image 540 of data index product 500 are set equal to title 405, brief description 430, detailed description 440, and thumbnail image 450 of highest ranked focus data product 157, 400. The $p^{th}$ object data products 155 linked to an element of the produced set of focus data products is indicated by $o_p$. The $q^{th}$ data item in object data product 155 $o_p$ is indicated by $s_{pq}$. In a preferred embodiment, each data item 360, 390 is a separate data file, and the $(pq)^{th}$ data item comprises a database link 558 to data item 360, 390 indicated by $s_{pq}$. In another embodiment, 550 further comprises thumbnail image 552, title 554, and brief description 556, corresponding to their respective counterparts in data item 360, 390.

At step 1150, field terminal 112 retrieves from database 120 over interface 261 data index product 500 comprising database links 109 to object data products 155 and stores data index product 500 in field terminal 112. Thus, these object data products 155 are linked to selected focus indices 169 of elements of the set of focus data products produced at step 1140. At step 1160, field terminal 112 presents data index product 500 to user 110 over interface 290. At step 1170, field terminal 112 receives from user 110 selection input data from user as user input over interface 294. At step 1180, field terminal 112 determines selected object data products and retrieves selected object data products 155 from database 120 over interface 261 and stores them locally as object data products 151 in non-volatile solid-state memory or a micro-hard-drive in field terminal 112. At step 1190, field terminal 112 performs an operation on retrieved object data products. More particularly, in a preferred embodiment, field terminal 112 displays images, shows video, and/or plays audio data items, thereby rendering and delivering user-interpretable output to user 110 over interface 290.

Therefore, in a preferred embodiment, field terminal 112 downloads a data index product 500, receives selection input from user 110, and selects an object data product 120 from data index product 500 only if object data product 120 satisfies criteria provided by selection input from user 110.

Figure 12:
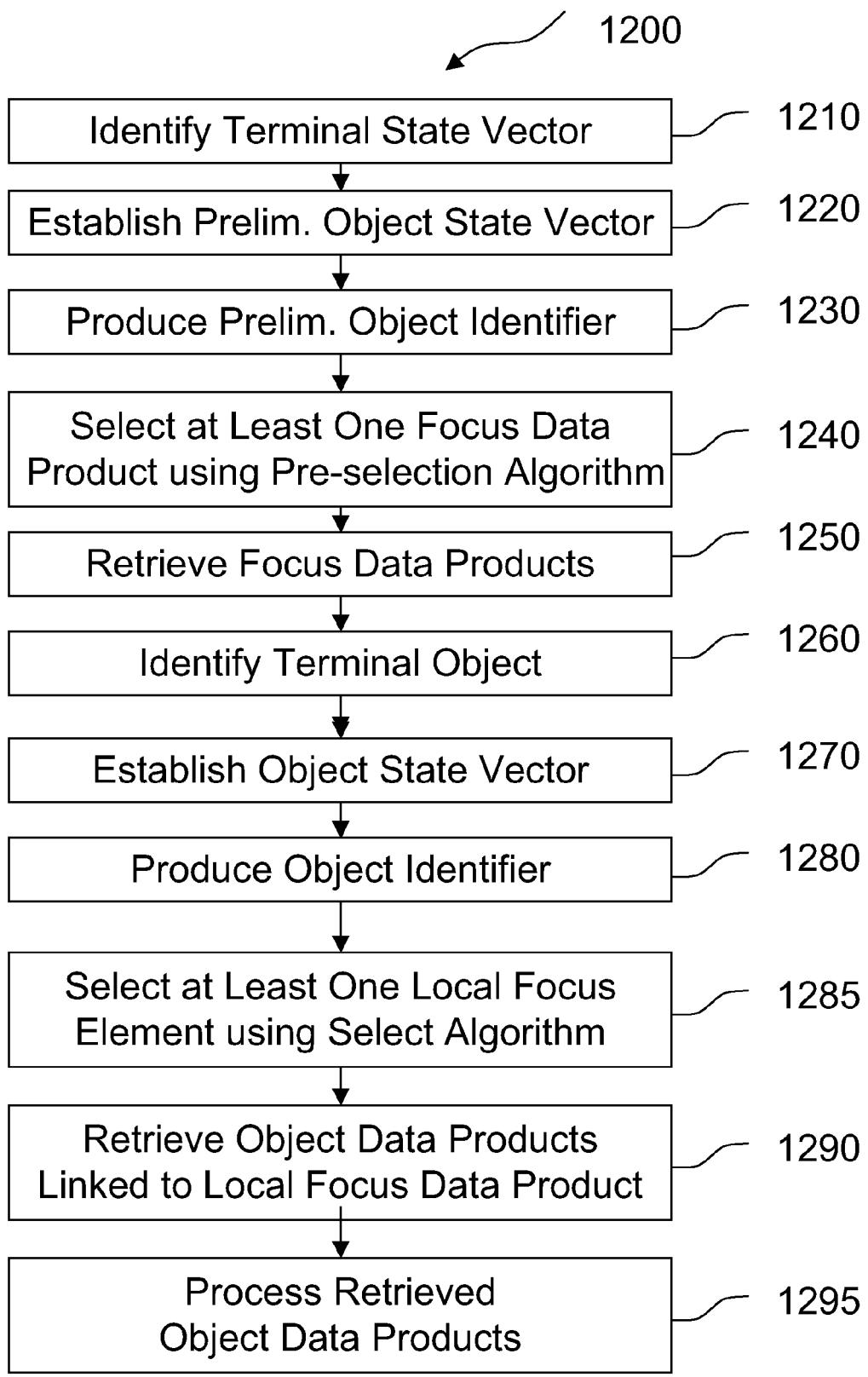
FIG. 12 is a flow diagram illustrating a method of retrieving and processing object data products that relate to a terminal object, utilizing data that is related to the terminal state vector and downloaded to a field terminal to support the selection processing at the field terminal.

FIG. 12 is a flow diagram illustrating a method of retrieving and processing object data products from a database in a field-accessed database system, according to a preferred embodiment of the present invention. Method 1200 establishes and employs an object state vector to download to field terminal 112 object data products 155 stored in database 120 and process downloaded object data products 155 for user access, by identifying and downloading selected focus data products 157 based on the state vector of field terminal 112, prior to selecting a field object and establishing its respective object state vector. At step 1210, a first field terminal 112 establishes terminal state vector. At step 1220, field terminal 112 establishes preliminary object state vector. In a preferred embodiment, preliminary object state vector is set equal to terminal state vector. At step 1230, field terminal produces preliminary object identifier 161, which is a data item that uniquely identifies preliminary object state vector. Preferably, terminal state vector, object state vector, and object identifier 161 are stored in field terminal 112.

At step 1240, field terminal executes machine readable code employing preliminary object identifier 161 to select a focus data product 157. Each focus data product 157 comprises focus identifier 167 that uniquely identifies the state vector associated with focus data product 157. In a preferred embodiment, field terminal 112 transmits preliminary object identifier 161 to system server over interface 248 to create preliminary object identifier 163. System server 116 retrieves each focus identifier 167 from database 120 over interface 276 to create each focus identifier 165. Thus, object identifier 163 traces to object identifier 161, and focus identifier 165 traces to focus identifier 167.

In a preferred embodiment, system server 116 executes machine readable code employing a pre-selection algorithm to produce a first set of focus data products 157 from a plurality of focus data products 157, each of this produced first set of focus data products 157 comprising a respective focus state vector, wherein the system server 116 selects a focus data product 157 to be an element of this produced first set of focus data products 157 if and only if its respective focus state vector satisfies predetermined relationship criteria with respect to preliminary object state vector established at step 1220. Preferably, this plurality of focus data products 157 comprises all focus data products stored in database 120. In another embodiment, system server 116 selects a focus data product 157 to be an element of this produced first set if its respective focus state vector satisfies predetermined relationship criteria with respect to the object state vector established at step 1220, and may include other focus data products 157 that meet other selection criteria. In still another embodiment, system server 116 selects a focus data product 157 to be an element of this produced first set only if its respective focus state vector satisfies predetermined relationship criteria with respect to the object state vector established at step 1220, but the produced set may not include all focus data products that meet the selection criteria. The produced first set of focus data products 157 may comprise one focus data product 157, may comprise more than one focus data product 157, or may comprise no focus data products 157.

In a preferred embodiment, at step 1250, field-accessed database system 100 downloads to field terminal 112 from database 120 this first set of focus data products 157, established at step 1240. Field terminal 112 stores each element of the first set of focus data products 157 locally in field terminal as respective focus data product 153, preferably in non-volatile solid-state memory or a micro-hard-drive.

At step 1260, field terminal 112 identifies terminal object. In one embodiment, step 1260 is accomplished by pointing field terminal 112 at object. In another embodiment, step 1260 is accomplished by retrieving a digital map based on terminal location from system server 116 and identifying terminal object on the retrieved digital map. At step 1270, field terminal 112 establishes object state vector. In one embodiment, object state vector is identical to terminal state vector. At step 1280, field terminal 112 produces object identifier 161, which is a data item that identifies object state vector.

At step 1285, field terminal 112 employs object identifier 161 to select focus data product 153 from the downloaded first set of focus data products 153. In a preferred embodiment, field terminal 112 executes machine readable code employing a final selection algorithm to produce a second set of focus data products 153 from the first set of focus data products 153 produced in step 1240, each of this second set of focus data products 153 comprising a respective focus state vector. Thus, field terminal 112 selects a focus data product 153 to be an element of the produced second set of focus data products 153 if and only if its respective focus state vector satisfies predetermined relationship criteria with respect to object state vector established at step 1270. In another embodiment, field terminal 112 selects a focus data product 153 to be an element of this produced second set if its respective focus state vector satisfies predetermined relationship criteria with respect to the object state vector established at step 1240, and may include other focus data products 153 that meet other selection criteria. In still another embodiment, field terminal 112 selects a focus data product 153 to be an element of this produced second set only if its respective focus state vector satisfies predetermined relationship criteria with respect to the object state vector established at step 1240, but the produced set may not include all focus data products that meet the final selection criteria. This produced second set of focus data products 153 may comprise one focus data product 153, may comprise more than one focus data product 153, or may comprise no focus data products 153.

In one embodiment, field terminal 112 executes machine readable code employing selection algorithm to compare object identifier 161 to each focus identifier 166 stored in field terminal 112, and relates it to the first set of focus data products 153. Field terminal 112 selects to be an element of this second set a focus data product 153 one whose respective focus state vector satisfies predetermined relationship criteria with respect to object state vector established at step 1240. Each selected focus data product 153 comprises corresponding focus index 164 residing in field terminal 112, which further comprises database links 107 to object data products 155 in database 120.

At step 1290, field terminal 112 retrieves object data products 155 linked to each selected focus data product 153 belonging to the second set of focus data products 153, using focus index 164 and stores them locally as object data products 151 in, for example, non-volatile solid-state memory or a micro-hard-drive.

In a preferred embodiment, at step 1290, field terminal retrieves from database 120 all object data products 155 linked to each selected focus data product 153 using focus index 164. In another embodiment, field terminal 112 selects a set of object data products 155 linked to the second set of focus data products 153 produced at step 1285, and downloads first field terminal 112 from database 120 this linked set of object data products 155, wherein database 112 is a subsystem of field-accessed database system. In one embodiment, field terminal 112 selects a set of object data products 155 based on a filter. A filter may limit selected object data products 155 to, for example, image, video, audio, text, and/or hybrid data. If the second set of selected focus data products 153 is the null set, field terminal 112 retrieves no object data products 155. Field terminal 112 maintains first and second sets of focus data products 153 stored therein.

At step 1295, field terminal processes retrieved object data products 151. More particularly, in a preferred embodiment, field terminal 112 displays images, shows video, and/or plays audio data items, thereby rendering and delivering user-interpretable output to user 110 over interface 290.

Figure 13:
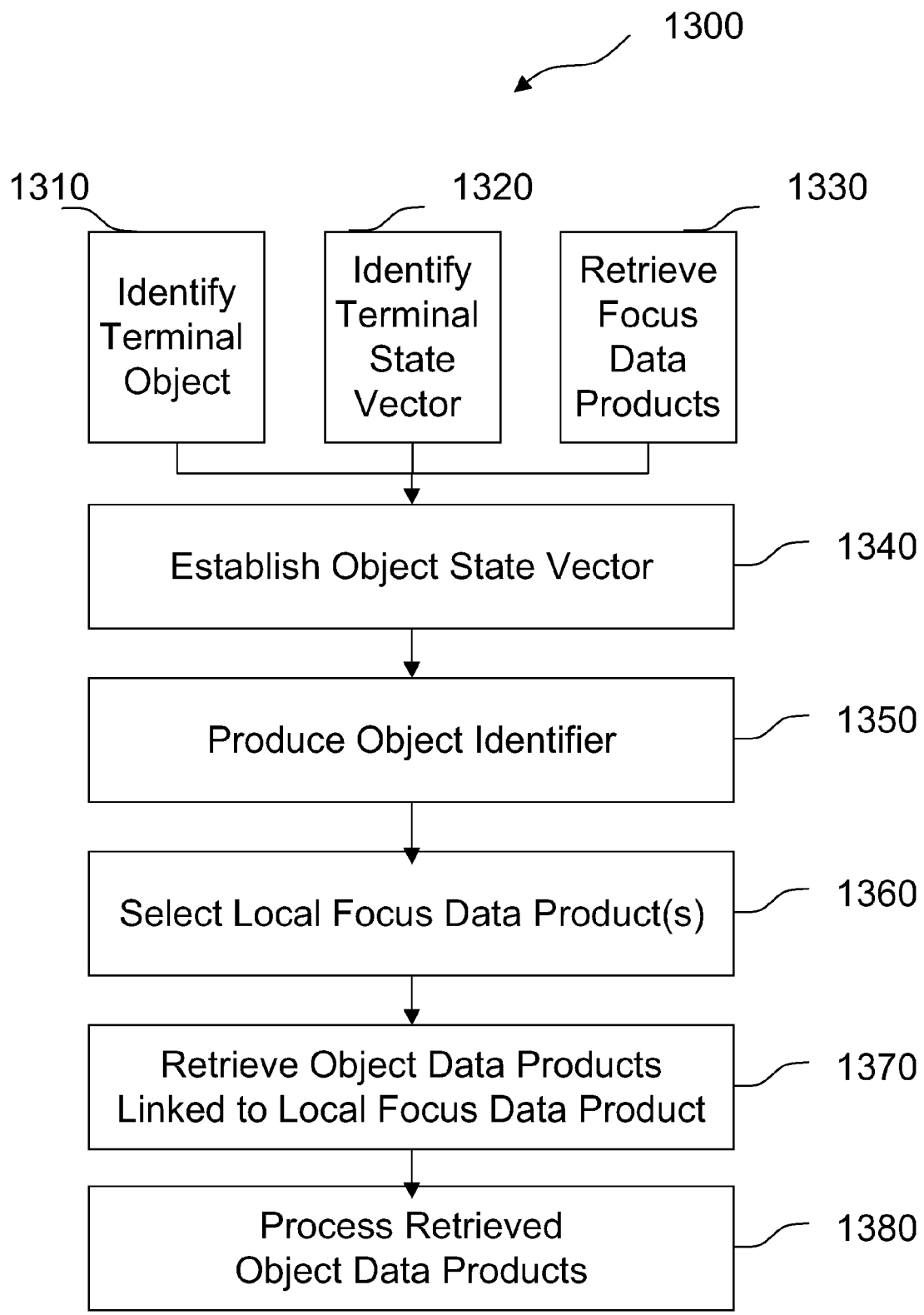
FIG. 13 is a flow diagram illustrating a method of retrieving and processing object data products that relate to a terminal object, utilizing data selected according to a pre-determined algorithm and downloaded to a field terminal to support the selection processing at the field terminal.

FIG. 13 is a flow diagram illustrating a method 1300 of retrieving data from a database in a field-accessed database system 100, according to a preferred embodiment of the present invention. Method 1300 identifies and employs an object state vector to retrieve object data products 155 stored in database 120, store them locally as object data products 151, and process local object data products 151 for user access. Method 1300 downloads focus data products 157 in advance and compares object state vectors to focus state vectors using field terminal 112. At step 1310, field terminal 112 identifies terminal object. At step 1320, field terminal 112 establishes terminal state vector. At step 1330, field terminal 112 retrieves a plurality of focus data products 157 from database 120, and stores them locally as focus data products 153. In a preferred embodiment, field terminal retrieves all focus data products 157 stored in database 120. In another embodiment, field terminal retrieves a subset of focus data products 157 stored in database 120, according to a pre-selection algorithm. Step 1310, step 1320, and step 1330 may occur without preference to order or simultaneity, i.e. step 1310, step 1320, and step 1330 may occur in any order, and any two or all three may occur simultaneously.

At step 1340, terminal 112 establishes object state vector. At step 1350, terminal produces object identifier 161, which is a data item that identifies object state vector.

At step 1360, field terminal 112 employs object identifier 161 to select focus data product 153. Each focus data product 153 has a corresponding focus identifier 166 that uniquely identifies the state vector associated with focus data product 153. In one embodiment, field terminal 112 executes machine readable code employing selection algorithm to compare object identifier 161 to each focus identifier 166 stored in field terminal 112, and field terminal 112 selects at least one focus data product 153, based on relationship between each focus identifier 166 and object identifier 161. In one embodiment, field terminal 112 employs selection algorithm to select a plurality of focus data products 153.

In a preferred embodiment, field terminal 112 executes machine readable code employing a selection algorithm to produce a set of focus data products 153 from a plurality of focus data products 153, each of this produced set of focus data products 153 comprising a respective focus state vector. Field terminal 112 selects a focus data product 153 to be an element of the produced set if and only if its respective focus state vector satisfies predetermined relationship criteria with respect to the object state vector established at step 1340. In another embodiment, field terminal 112 selects a focus data product 153 to be an element of the produced set if its respective focus state vector satisfies predetermined relationship criteria with respect to the object state vector established at step 1340, and may include other focus data products 153 that meet other selection criteria. In still another embodiment, field terminal 112 selects a focus data product 153 to be an element of the produced set only if its respective focus state vector satisfies predetermined relationship criteria with respect to the object state vector established at step 1340, but the produced set may not include all focus data products that meet the selection criteria. In a preferred embodiment, field terminal 112 maintains an index of the produced set of focus data products as a set data product stored therein comprising a list of each element data product, wherein each entry in the list is accompanied by a link to its respective data product. In a preferred embodiment, this set data product is a focus index product 600. Preferably, the plurality of focus data products 153 employed to produce the set of focus data products 157 comprises all focus data products 153 stored in field terminal 112. The produced set of focus data products 153 may comprise one focus data product 153, may comprise more than one focus data product 153, or may comprise no focus data products 153.

Each selected focus data product 153 comprises focus index 164, which further comprises database links 107 to object data products 155 in database 120. At step 1370, field terminal retrieves object data products 155 linked to each selected focus data product 153 using focus index residing in field terminal and stores them locally in field terminal 112 as object data products 151 in, for example, non-volatile solid-state memory or a micro-hard-drive. At step 1380, field terminal processes retrieved object data products 151. More particularly, in a preferred embodiment, field terminal 112 displays images, shows video, and/or plays audio data items, thereby rendering and delivering user-interpretable output to user 110 over interface 290. In a preferred embodiment, field terminal 116 maintains an index of retrieved object data products 151 as a set data product stored therein comprising a list of each element data product, wherein each entry in the list is accompanied by a link to its respective data product. In a preferred embodiment, this set data product is a data index product 500.

Figure 14A:
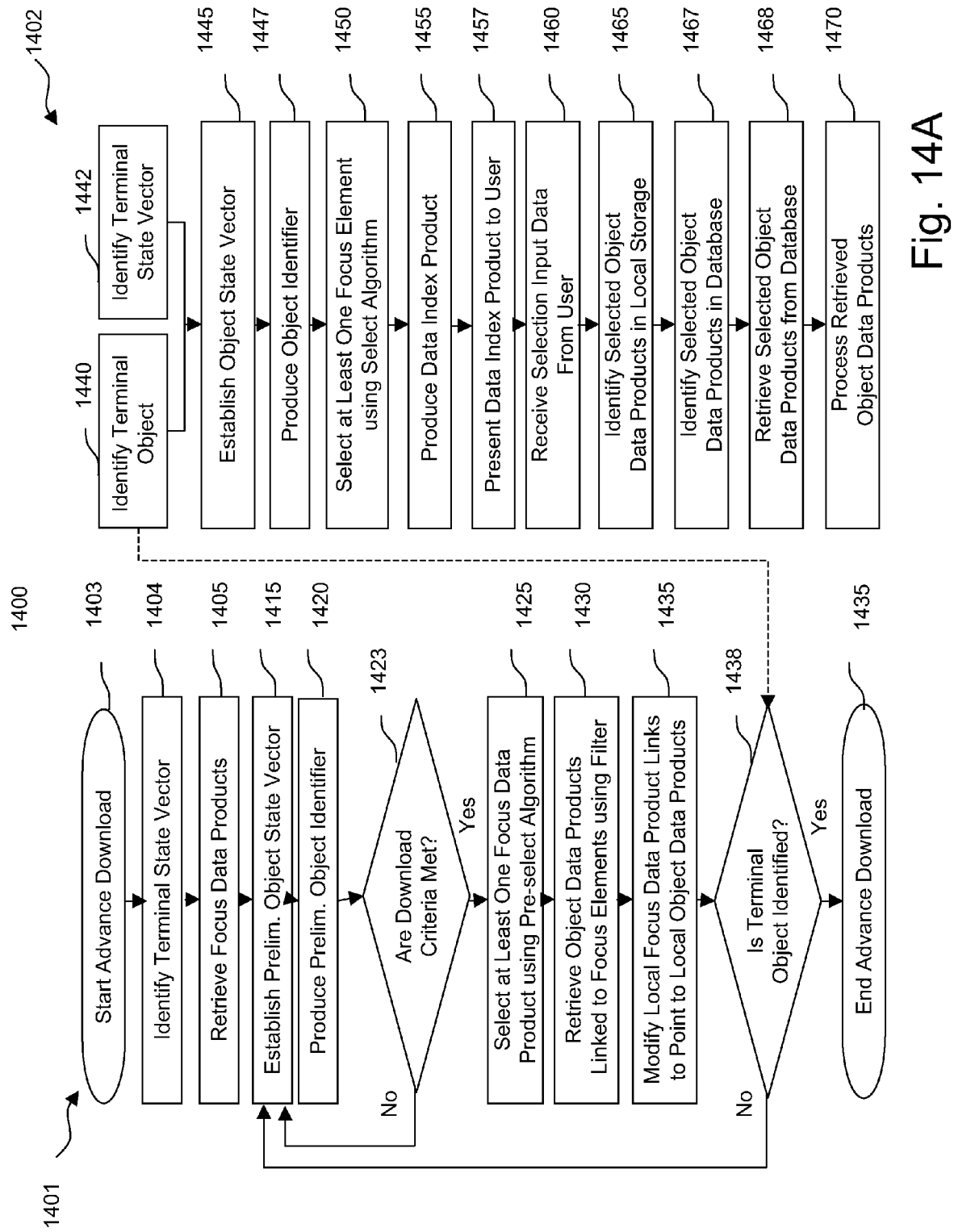
FIG. 14A is a flow diagram illustrating a one embodiment of a method of retrieving from a database data that relates to a terminal object, wherein a field terminal operates in discover mode to retrieve data products that may be of interest to a user prior to receiving user input.

FIG. 14A is a flow diagram illustrating a method 1400 of retrieving data from a database 120 in a field-accessed database system 100, according to a preferred embodiment of the present invention. Using method 1400, field terminal 112 operates in discover mode to retrieve data products 155 that may be of interest to a user prior to receiving user input and store them as object data products 151 in field terminal.

Advance download subprocess 1401 begins at step 1403. Subprocess 1401 has an inner and an outer loop. At step 1403, loop counter c is set equal to 1. At step 1404, field terminal 112 establishes terminal state vector. At step 1405, field terminal 112 retrieves a plurality of focus data products 157 from database 120, and stores them therein. In a preferred embodiment, field terminal 112 retrieves all focus data products 157 stored in database 120. In another embodiment, field terminal 112 retrieves a subset of focus data products 157 stored in database 120, according to a filter algorithm. Filter algorithm may utilize terminal state vector to determine the subset of focus data products 157 to retrieve.

In a preferred embodiment, step 1405 further comprises downloading to a first field terminal from database a plurality of focus data products 157, wherein an $i^{th}$ focus data product 153 downloaded to and stored in first field terminal 112, $f_i'$, traces to a $i^{th}$ focus data product 157 in database 120, $f_i$. Thus, $f_i$ and $f_i'$ represent the $i^{th}$ original focus data product 157 and the $i^{th}$ downloaded focus data products 153 respectively. In general, a downloaded data product d' in field terminal 112 generally traces to data product d in database 120 if, at the time it is downloaded, d' comprises the same data as d.

At step 1415, field terminal 112 establishes preliminary object state vector. In a preferred embodiment, preliminary object state vector is set equal to terminal state vector. At step 1420, field terminal 112 produces preliminary object identifier, which is a data item that identifies preliminary object state vector. In a preferred embodiment, step 1415 comprises processing a locator signal to determine a terminal state vector corresponding to a first field terminal and setting preliminary object state vector equal to terminal state vector established at step 1404.

At step 1423, field terminal 112 executes machine readable code to determine whether download criteria are met. In a preferred embodiment, download criteria are met if loop counter c=1, and download criteria are met if loop counter c>=2 and the current object state vector established at step 1415 is substantially different than previous object state vector, according to pre-determined change criteria. If download criteria are met, advance download sub-process 1401 increments loop counter c by 1, sets previous object state vector equal to current object state vector, and proceeds to step 1425. If download criteria are not met, advance download subprocess 1401 returns to step 1415 and proceeds through the flow. In one embodiment, subprocess 1401 pauses for a pre-determined period of time prior to returning to step 1415.

At step 1425, field terminal 112 executes machine readable code employing a pre-selection algorithm to select at first set of focus data product 157 based on preliminary object identifier. In one embodiment, at step 1425 field terminal 112 executes machine readable code employing pre-selection algorithm to produce a first set of focus data products 153 from a plurality of focus data products 153, each element of this first set of focus data products 153 comprising a respective focus state vector, wherein the pre-selection algorithm selects a focus data product 153 to be an element of the produced first set of focus data products 153 if and only if its respective focus state vector satisfies predetermined relationship criteria with respect to preliminary object state vector established as equal to terminal state vector at step 1415. In another embodiment, field terminal 112 selects a focus data product 153 to be an element of this produced first set if its respective focus state vector satisfies predetermined relationship criteria with respect to the object state vector established at step 1415, and may include other focus data products 153 that meet other selection criteria. In still another embodiment, field terminal 112 selects a focus data product 153 to be an element of this produced first set only if its respective focus state vector satisfies predetermined relationship criteria with respect to the object state vector established at step 1415, but the produced set may not include all focus data products that meet the selection criteria. Preferably, the plurality of focus data products 153 comprises all focus data products stored in database 120. The produced first set of focus data products 153 may comprise one focus data product 153, may comprise more than one focus data product 153, or may comprise no focus data products 153.

At step 1430, field terminal 112 retrieves from database 120 object data products 155 linked to elements of the first set of focus data products 157 established at step 1425 via database links 109 and stores received object data products 155 as object data products 151 in field terminal 112 using, for example, non-volatile solid-state memory or a micro-hard-drive. In a preferred embodiment, pre-existing object data products 151 in field terminal 112 are erased according to a priority rule when storage space is needed to accommodate newly retrieved data. In another preferred embodiment, a filter is used to retrieve only object data products 155 meeting pre-determined selection criteria. For example, selection criteria may be used to filter object data products 155 by type, e.g. audio, image, or video.

In a preferred embodiment 1430 comprises selecting a first set of object data products 155 linked whose elements are linked to the elements of a first set of focus data products 157 established at step 1425, wherein the object data products 155 are stored in database 120, and downloading to first field terminal 112 from database 120 this first set of object data products 155, wherein a $j^{th}$ of this first set of object data products 151 downloaded to and stored in said first field terminal, $o_j'$, traces to a $j^{th}$ of the plurality of object data products 155 in database 120, $o_j$. Thus, $o_j$ and $o_j'$ represent the $j^{th}$ original focus data product 155 and the $j^{th}$ downloaded focus data products 151 respectively. Data downloaded to field terminal 112 are stored therein. In database 120, the relationship between focus data product $f_i$ and object data product $o_j$ is characterized by link coefficient $L_{ij}$, wherein $L_{ij}=1$ if $f_i$ comprises database link 109 to $o_j$, and is $L_{ij}=0$ if $f_i$ does not comprise database link 109 to $o_j$.

Each stored focus data product 153 comprises focus index 168. At step 1435, field terminal 112 modifies data stored in each focus index 168 to comprise links 108 pointing to local object data products 151 retrieved from database 120 and previously associated with a respective focus link 109 in database 120. Thus, in a preferred embodiment, each focus index 168 is updated to point to the local copies 151 of the object data products 155 retrieved from database 120. In one embodiment, step 1435 comprises establishing database link 108 to downloaded object data product, $o_j'$, from downloaded focus data product $f_i'$, if and only if $L_{ij}=1$.

At step 1438, field terminal 112 determines if retrieval sub-process 1402 has identified terminal object. If terminal object has been identified, advance download sub-process 1401 proceeds to step 1435 and terminates. Downloaded data remains locally stored in field terminal 112. If terminal object is not identified, advance download sub-process 1401 proceeds to step 1415, and then executes the steps in the flow from there.

Retrieval sub-process 1402 begins with step 1440. At step 1440, terminal 112 identifies terminal object. When step 1440 is complete, data is recorded for use in step 1438 in advance download sub-process 1401. At step 1442, terminal 112 identifies terminal state vector. Step 1440 and step 1442 may occur in either order or simultaneously. At step 1445, terminal 112 establishes object state vector. In one embodiment, object state vector is set equal to terminal state vector. In another embodiment, object state vector is calculated based on position identified on digital map. At step 1447, terminal produces object identifier 161, which is a data item that identifies object state vector.

In a preferred embodiment, field terminal 112 executes machine readable code employing a final selection algorithm to produce a second set of focus data products 153 from a first set of focus data products 153 established in step 1425, each of this produced second set of focus data products 153 comprising a respective focus state vector, wherein the final selection algorithm selects a focus data product 153 to be an element of this produced second set of focus data products 153 if and only if its respective focus state vector satisfies predetermined relationship criteria with respect to object state vector established at step 1445. In another embodiment, field terminal 112 selects a focus data product 153 to be an element of this produced second set if its respective focus state vector satisfies predetermined relationship criteria with respect to the object state vector established at step 1445, and may include other focus data products 153 that meet other selection criteria. In still another embodiment, field terminal 112 selects a focus data product 153 to be an element of this produced second set only if its respective focus state vector satisfies predetermined relationship criteria with respect to the object state vector established at step 1445, but the produced set may not include all focus data products that meet the selection criteria. This second set of focus data products 153 may comprise one focus data product 153, may comprise more than one focus data product 153, or may comprise no focus data products 153. A selected focus data product 153, stored in field terminal 112, comprises a focus index 168. Focus index 168 comprises database links 108 to object data products 151.

In one embodiment, at step 1455, system server 116 produces data index product 500 stored therein by populating data index product 500 member classes with data drawn from the set of focus data products 153 produced at step 1140 and the object data products 151 linked to each element from the produced set of focus data products. In one embodiment, focus data products are ranked from highest to lowest ranking according to a ranking algorithm. For example, if a focus data product 153 is selected according to the proximity of its focus state vector to an object state vector, based on location, then the focus data product 153 having a location closest to the object has the highest ranking. Title 505, brief description 510, detailed description 530, and thumbnail image 540 of data index product 500 are set equal to title 405, brief description 430, detailed description 440, and thumbnail image 450 of highest ranked focus data product 153, 400. The $p^{th}$ object data products 151 linked to an element of the produced set of focus data products is indicated by $o_p'$. The $q^{th}$ data item in object data product 151 $o_p'$ is indicated by $s_{pq}'$. In a preferred embodiment, each data item 360, 390 is a separate data file, and the $(pq)^{th}$ data item comprises a database link 558 to data item 360, 390 indicated by $s_{pq}'$. In another embodiment, 550 further comprises thumbnail image 552, title 554, and brief description 556, corresponding to their respective counterparts in data item 360, 390.

At step 1457, field terminal 112 downloads data index product 500 from system server 116, stores downloaded data index product in field terminal 112, and executes machine readable code to present data index product 500 to user using a graphical user interface capable of receiving user input. At step 1460, field terminal 112 receives from user 110 selection input data from user as user input over interface 294.

At step 1465, field terminal 112 determines user selected object data products 151 based on selection input data received from user 110 over interface 294 and identifies selected object data products 151 stored locally 120. One embodiment includes optional step 1467. At step 1467, field terminal 112 identifies selected new object data products that have not yet been downloaded based on selection input data. At step 1468, field terminal 112 retrieves selected new object data products 155 from database 120 over interface 261, and stores selected new object data products 151 therein in non-volatile solid-state memory or a micro-hard-drive. Corresponding focus index 168 is updated to include links 108 to new object data products 151. At step 1470, field terminal 112 processes retrieved object data products 151. More particularly, in a preferred embodiment, field terminal 112 processes retrieved object data products 151 to display images, show video, and/or play audio data items, thereby rendering and delivering user-interpretable output to user 110 over interface 290. In a preferred embodiment, field terminal 112 maintains an index of each set of retrieved object data products 151 as a set data product stored therein comprising a list of each element data product, wherein each entry in the list is accompanied by a link to its respective data product. In a preferred embodiment, this set data product is a data index product 500. Preferably, terminal state vector and object state vector reside in field terminal 112 as stored data.

Figure 14B:
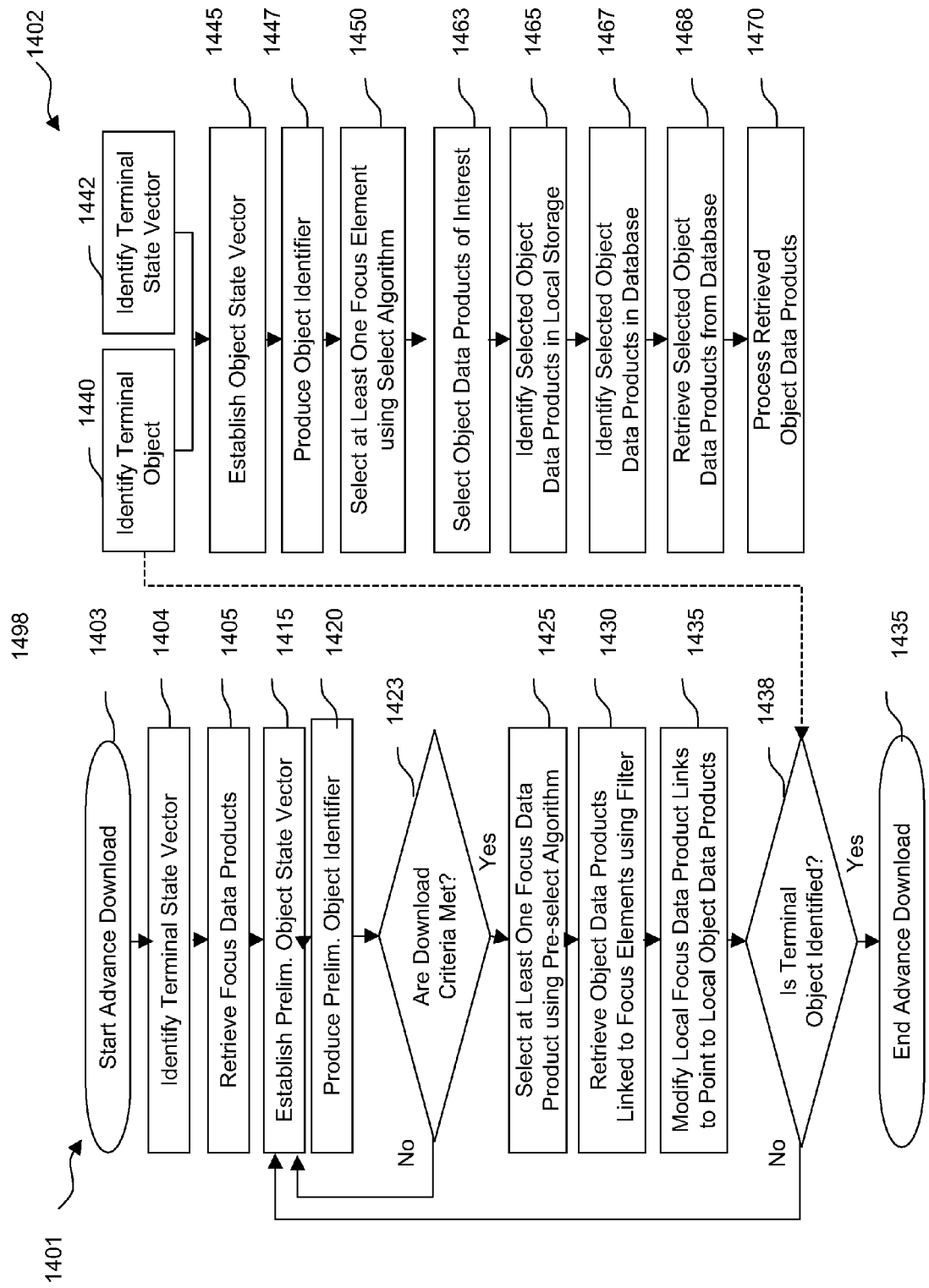
FIG. 14B is a flow diagram illustrating another embodiment of a method of retrieving from a database data that relates to a terminal object, wherein a field terminal operates in discover mode to retrieve data products that may be of interest to a user prior to receiving user input.

FIG. 14B illustrates another embodiment of a method employing a discover mode 1498, in which steps 1455, 1457, and 1460 are replaced with one step 1463, in which field terminal 112 executes machine readable code employing predetermined selection criteria to select a second set of object data products 151, wherein each element of this second set of object data products 151 is linked to an element of the second set of focus data products 153 established at step 1450. At step 1465, field terminal 112 selects as elements of second set of object data products 151 from object data products 151 currently residing in field terminal 112. At step 1467, field terminal 112 selects as elements of second set of object data products 151 from object data products 155 currently residing in database 120. Steps 1468 and 1470 proceed as before.

Figure 14C:
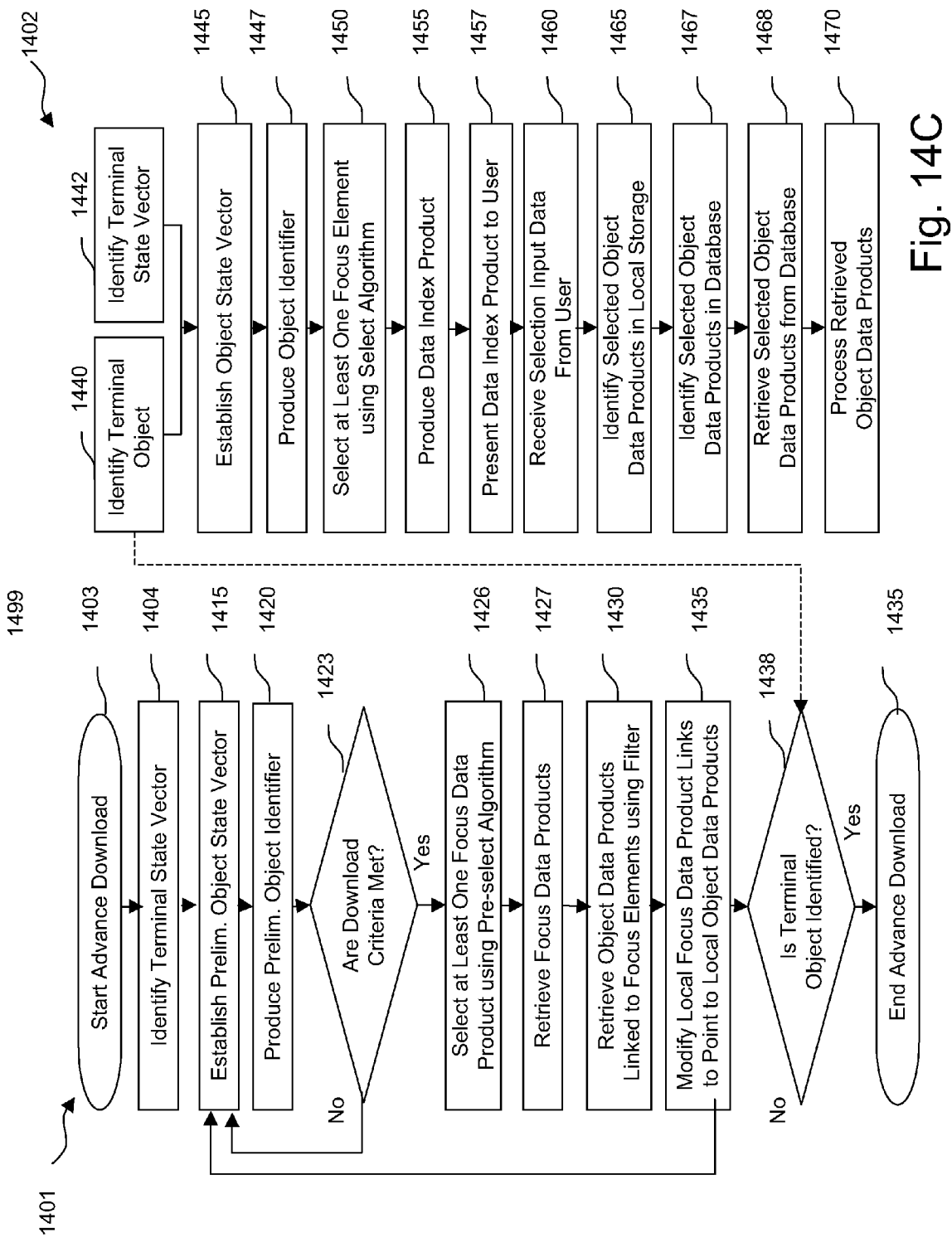
FIG. 14C is a flow diagram illustrating still another embodiment of a method of retrieving from a database data that relates to a terminal object, wherein a field terminal operates in discover mode to retrieve data products that may be of interest to a user prior to receiving user input.

FIG. 14C illustrates still another embodiment of a method employing a discover mode 1499, in which step 1425 is replaced with step 1426 and step 1427. At step 1426, field terminal 112 employs preliminary object identifier to select at first set of focus data product 157 using pre-selection algorithm. In one embodiment, at step 1426, field terminal executes machine readable code employing a pre-selection algorithm to produce a first set of focus data products 157 from a plurality of focus data products 157, each element of this first set of focus data products 157 comprising a respective focus state vector, wherein the pre-selection algorithm selects a focus data product 157 to be an element of the produced first set of focus data products 157 if and only if its respective focus state vector satisfies predetermined relationship criteria with respect to preliminary object state vector established as equal to terminal state vector at step 1415. In another embodiment, field terminal 112 selects a focus data product 157 to be an element of this produced first set if its respective focus state vector satisfies predetermined relationship criteria with respect to the object state vector established at step 1415, and may include other focus data products 157 that meet other selection criteria. In still another embodiment, field terminal 112 selects a focus data product 157 to be an element of this produced first set only if its respective focus state vector satisfies predetermined relationship criteria with respect to the object state vector established at step 1415, but the produced set may not include all focus data products that meet the selection criteria. Preferably, the plurality of focus data products 157 comprises all focus data products stored in database 120. The produced first set of focus data products 157 may comprise one focus data product 157, may comprise more than one focus data product 157, or may comprise no focus data products 157.

In a preferred embodiment, step 1427 further comprises downloading to a first field terminal 112 from database a plurality of focus data products 157, wherein an $i^{th}$ focus data product 153 downloaded to and stored in first field terminal 112, $f_i'$, traces to a $i^{th}$ focus data product 157 in database 120, $f_i$. Thus, $f_i$ and $f_i'$ represent the $i^{th}$ original focus data product 157 and the $i^{th}$ downloaded focus data products 153 respectively. Downloaded focus data products 153 are stored in first field terminal 112.

Figure 15:
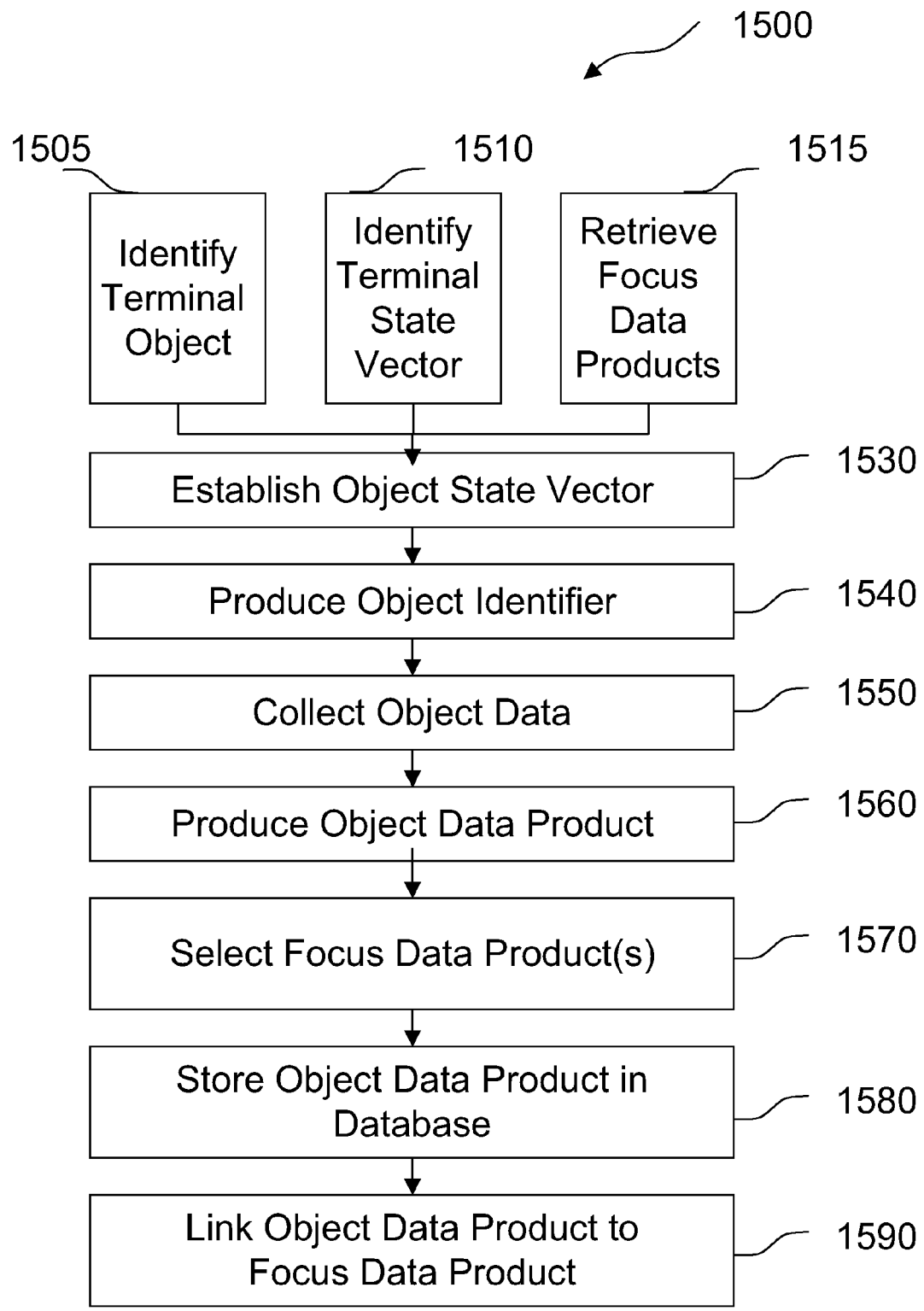
FIG. 15 is a flow diagram illustrating a method of storing object data products that relate to a terminal object, utilizing data selected according to a pre-determined algorithm and downloaded to a field terminal to support the selection processing at the field terminal.

FIG. 15 is a flow diagram illustrating a method of retrieving data from a database in a field-accessed database system 100, according to a preferred embodiment of the present invention. Method 1500 downloads focus data products 157 in advance and compares object data vectors to focus state vectors using field terminal. Method 1500 collects and stores object data, produces an object data product 151, and identifies and employs an object state vector to store object data product 151 in database 120 and links object data product them to an appropriate focus data product for later recall. At step 1505, terminal 112 identifies terminal object. At step 1510, terminal 112 identifies terminal state vector. At step 1515, field terminal 112 retrieves a plurality of focus data products 157 from database 120. In a preferred embodiment, field terminal 112 retrieves all focus data products 157 stored in database 120. In another embodiment, field terminal retrieves a subset of focus data products 157 stored in database 120, according to a pre-selection algorithm. Step 1505, step 1510, and step 1515 may occur without preference to order or simultaneity, i.e. step 1505, step 1510, and step 1515 may occur in any order, and any two or all three may occur simultaneously. Retrieved focus data products 153 are stored in field terminal 112.

At step 1530, field terminal 112 establishes object state vector. At step 1540, field terminal 112 produces object identifier, which is a data item that uniquely identifies object state vector.

At step 1550, field terminal collects object data 128 from local environment 102 over interface 228. In a preferred embodiment, object data comprises image, video, and/or audio data. At step 1560 field terminal 112 produces object data product 151. Object data product 151 comprises data member classes as defined for object data product 300.

At step 1570, field terminal 112 executes machine readable code employing object identifier 161 to select focus data product 153. Each focus data product 153 has a corresponding focus identifier 166 that uniquely identifies the state vector associated with focus data product 153. In one embodiment, field terminal 112 executes machine readable code employing a selection algorithm to compare object identifier 161 to each focus identifier 166 stored in field terminal 112, and field terminal 112 selects at least one focus data product 153, based on relationship between each focus identifier 166 and object identifier 161. In one embodiment, field terminal 112 selects a plurality of focus data products 153.

In a preferred embodiment, at step 1570, field terminal 112 executes machine readable code employing a selection algorithm to produce a set of focus data products 153 from a plurality of focus data products 153, each of this produced set of focus data products 153 comprising a respective focus state vector, wherein the selection algorithm selects a focus data product 153 to be an element of the produced set if and only if its respective focus state vector satisfies predetermined relationship criteria with respect to the object state vector established at step 1530. In one embodiment, field terminal 112 selects a focus data product 153 to be an element of the produced set if its respective focus state vector satisfies predetermined relationship criteria with respect to the object state vector established at step 1530, and may include other focus data products 153 that meet other selection criteria. In another embodiment, field terminal 112 selects a focus data product 153 to be an element of the produced set only if its respective focus state vector satisfies predetermined relationship criteria with respect to the object state vector established at step 1530, but the produced set may not include all focus data products that meet the selection criteria. In a preferred embodiment, field terminal 112 maintains an index of a produced set of focus data products as a set data product stored therein comprising a list of each element data product, wherein each entry in the list is accompanied by a link to its respective data product. In a preferred embodiment, this set data product is a focus index product 600. Preferably, the plurality of focus data products 153 employed to produce the set of focus data products 157 comprises all focus data products 153 stored in field terminal 112. The produced set of focus data products 153 may comprise one focus data product 153, may comprise more than one focus data product 153, or may comprise no focus data products 153.

At step 1580, field terminal 112 stores new object data product 155 in database 120. At step 1590, database 120 identifies each focus data product 157, corresponding to focus data product 153 selected in step 1570, having respective having focus index 169, and database 120 updates data stored in focus index 169 to include database link 109 to new object data product 155, thus linking new object data product to focus data product 157.

Figure 16:
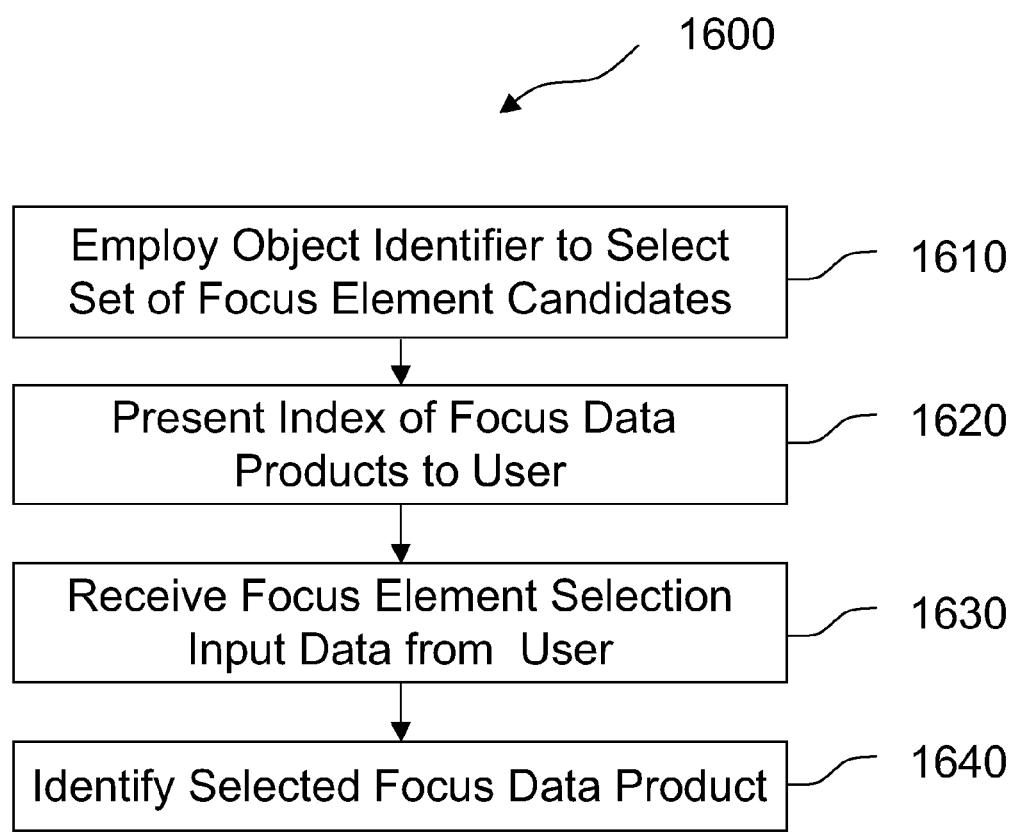
FIG. 16 is a flow diagram illustrating a method of selecting possible object matches using data products retrieved from a database in a field-accessed database system.

FIG. 16 is a flow diagram illustrating a method 1600 of selecting, downloading, and storing focus data products 157 by field terminal 112 from database 120. At step 1610, a predetermined object identifier 161 is employed to select a set of focus data product 157 candidates. At step 1620, field terminal 112 presents focus index product 600 to user 110 using terminal output interface 290. Focus index product 600 comprises set of focus data product candidates established at step 1610. Focus index product 600 is stored in field terminal 112.

In one embodiment, system server 116 produces focus index product 600 by populating focus index product 600 member classes with data drawn from the set of focus data products 157 residing in system server 116 produced at step 1610.

In another embodiment, at step 1610, a predetermined object identifier 161 is employed to select a set of focus data product 153 candidates residing in field terminal 112. Field terminal 112 produces focus index product 600 by populating focus index product 600 member classes with data drawn from the set of focus data products 153 produced at step 1610. In still another embodiment, some focus data products reside in system server 116 and some focus data products reside in field terminal 112.

In one embodiment, focus data products 157 and/or 153 are ranked from highest to lowest ranking according to a ranking algorithm. For example, if a focus data product 157 or 153 is selected according to the proximity of its focus state vector to an object state vector, based on location, then the focus data product 157 or 153 having a location closest to the object has the highest ranking. Title 605, brief description 610, detailed description 630, and thumbnail image 640 of focus index product 600 are set equal to title 405, brief description 430, detailed description 440, and thumbnail image 450 of highest ranked focus data product 157 or 153, 400. In a preferred embodiment, each focus data product reference 1, ..., Q 650, 690 comprises a database link 658 to its respective focus data product 157 or 153. In another embodiment, each focus data product reference 1, ..., Q 650, 690 comprises thumbnail image 652, title 654, and brief description 656, corresponding to their respective counterparts in its respective focus data product.

At step 1630, field terminal 112 receives focus data product selection data from user 110 as user input over interface 294. At step 1640, field terminal 112 processes user input to identify selected focus data products 157 and/or 153 and maintains a list of selected focus data products 157 and/or 153 as a list in set data product stored therein.

Method 1600 is applied as an alternative step in methods 700, 800, 1100, 1300, and 1500 described hereinabove. In an alternative embodiment of method 700, step 740 selects focus data products 157 using method 1600, so that focus data products 157 are based on user 110 input. In an alternative embodiment of method 800, step 860 selects focus data product 157 using method 1600, so that focus data products 157 are based on user 110 input. In an alternative embodiment to method 1100, step 1140 selects focus data products 157 using method 1600, so that focus data products 157 are based on user 110 input. In an alternative embodiment to method 1300, step 1360 selects focus data products 157 using method 1600, so that focus data products 157 are based on user 110 input. In an alternative embodiment to method 1500, step 1570 selects focus data products 157 using method 1600, so that focus data products 157 are based on user 110.

In addition to the aforementioned embodiments, a number of variations and implementations are possible. A field terminal may be configured to receive entry without the use of alphanumeric entry approaches such as keyboard or touch screen keypad entry. In various embodiments, digital map based locators facilitate object identification, and data index products 500 and focus index products 600 facilitate data file selection for processing and user access. In various embodiments, an object state vector can be determined using a library of saved identifiers, a shared set of identifiers, or a downloaded set of identifiers representing a common theme. In various embodiments, data index products 500 can be saved in database 120 for shared access with other users and/or in field terminal 112 for later access by field terminal user. Although low-speed interfaces and high-speed interfaces have been described for exemplary embodiments of the invention, a skilled artisan will recognize that there may be advantages to transmitting focus data products, data index products, focus index products, and/or other data products over low-speed interfaces. A skilled artisan will further recognize that the functional high- and low-speed interfaces may be implemented using a common physical interface.

In the embodiments of the invention described hereinabove, object data products 155 are downloaded to field terminal 112 and stored therein. It will be apparent to a skilled artisan that, in alternative embodiments of the present invention, object data products 155 may be selected and accessed in other ways, including streaming video and streaming audio. An object data product 155 may be streamed to a field terminal for immediate rendering as user-interpretable output. In one embodiment, sequential data blocks of streaming data are stored in field terminal 112, presented to user via user interface such as video or audio output, and deleted once presented. A skilled artisan will recognize that the foregoing embodiments can readily be adapted to streaming applications.

EXAMPLE

A preferred embodiment of the present invention is further illustrated hereinbelow using a specific example of operation. In this example, a user 110 possesses a mobile unit 112 with GPS capability, such as a personal digital assistant, in the public access area immediately adjacent to the Golden Gate Bridge in San Francisco, Calif. The user 110 approaches the Golden Gate Bridge from the south. Mobile unit 112 recognizes that it is in a new location. Mobile unit 112 calculates preliminary object identifier 161 using GPS locator 104, connects to system server 116 over a wireless network, and downloads from a database 120 all object data products 155 linked to a focus data product 157 having a focus identifier 167 corresponding to an 1600 meter radius of preliminary object identifier 161. The Golden Gate Bridge lies within this 1600 meter radius of mobile unit 112. The user 110 subsequently employs mobile unit 112 to select the Golden Gate Bridge as object of interest using a digital map centered on physical location of mobile unit 112. Mobile unit 112 then selects object data products 155 corresponding to the Golden Gate Bridge and presents user with a browser-type interface listing thumbnails and brief descriptions of selected data products, which are organized by photos, videos, audio, and text description. The user selects first video data product and views a 1 minute video essay of the Golden Gate Bridge The user then collects 5 digital images of the Golden Gate Bridge using a digital camera built in to the mobile unit. Mobile unit 112 groups digital images into new object data products 151 and uploads object data products 151 to database 120. Database 120 then groups new object data products 155 with current set of object data products 155 corresponding the Golden Gate Bridge, according to a common focus data product 157, and the grouped object data products 155 are subsequently available for shared access and download by another user 110. In particular, object data products 155 relating to a common reference point of interest comprise the video essay and 5 digital images referenced hereinabove, and are grouped together via database links 109 to a common focus data product 157 also relating to a common reference point of interest.

It will be apparent from the foregoing that, while particular forms of the invention have been illustrated and described, various modifications can be made without departing from the spirit and scope of the invention. Accordingly, it is not intended that the invention be limited, except as determined by the following claims and their legal equivalents.

What is claimed is:

1. A system comprising a first portable device and a database,
    said first portable device being used to identify a physical object and to establish location data for said physical object, said location data identifying the location of said physical object;
    said first portable device collecting data related to said physical object and producing a first object data product comprising said data;
    uploading said first object data product and said location data to said database;
    selecting a first reference point in said database, said first reference point comprising location data specifying a location related to the location of said physical object;
    linking said first object data product to said first reference point in said database.

2. The system of claim 1, wherein said first reference point comprises location data specifying a location within a predetermined distance of said physical object.

3. The system of claim 2, wherein said first reference point comprises location data equal to the location data of said physical object.

4. The system of claim 1 further comprising producing a new reference point comprising location data specifying a location related to the location of said physical object.

5. The system of claim 4, wherein said new reference point comprises location data specifying a location within a predetermined distance of said physical object.

6. The system of claim 5, wherein said new reference point comprises location data equal to the location data of said physical object.

7. The system of claim 1, wherein said database comprises a second object data product previously uploaded from a second portable device and stored in said database, and said second object data product is linked to said reference point.

8. The system of claim 7, wherein said first object data product and said second object data product have different data structures.

9. The system of claim 7, wherein said first object data product and said second object data product each comprise digital media.

10. The system of claim 1, wherein said first portable device is selected from the group consisting of smartphone, personal digital assistant, iPhone, unit with GPS capability, and portable network-attached device.

11. The system of claim 1, wherein said first object data product comprises digital media.

12. A system comprising a first portable device and a database,
    said first portable device being used to identify a physical object and establishing location data for said physical object, said location data identifying the location of said physical object;
    selecting a first reference point in said database, said first reference point comprising location data specifying a location related to the location of said physical object;
    downloading to said first portable device a first object data product linked to said first reference point.

13. The system of claim 12, wherein said first reference point comprises location data specifying a location within a predetermined distance of said physical object.

14. The system of claim 13, wherein said new reference point comprises location data equal to the location data of said physical object.

15. The system of claim 12, wherein said first portable device presents user-interpretable output based on first object data product.

16. The system of claim 12, wherein said database comprises a second object data product previously uploaded from a second portable device and stored in said database, said second object data product linked to said first reference point.

17. The system of claim 16, wherein said first object data product and said second object data product have different data structures.

18. The system of claim 16, where in said first object data product and said second object data product each comprise digital media.

19. The system of claim 12, wherein said first portable device is selected from the group consisting of smartphone, personal digital assistant, iPhone, unit with GPS capability, and portable network-attached device.

20. The system of claim 12, wherein said first object data product comprises digital media.

* * * * *